US012809701B2

(12) United States Patent
Zheng

(10) Patent No.: US 12,809,701 B2
(45) Date of Patent: Nov. 24, 2026

(54) DATA PROCESSING METHOD AND APPARATUS, AND SYSTEM

(71) Applicant: HUAWEI TECHNOLOGIES CO., LTD., Shenzhen (CN)

(72) Inventor: Kun Zheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 414 days.

(21) Appl. No.: 18/491,844

(22) Filed: Oct. 23, 2023

(65) Prior Publication Data

US 2024/0054031 A1 Feb. 15, 2024

Related U.S. Application Data

(63) Continuation of application No. PCT/CN2022/085353, filed on Apr. 6, 2022.

(30) Foreign Application Priority Data

Apr. 29, 2021 (CN) ......................... 202110477608.3

(51) Int. Cl.
*G06F 9/54* (2006.01)
*G06F 15/173* (2006.01)

(52) U.S. Cl.
CPC ........ *G06F 9/546* (2013.01); *G06F 15/17375* (2013.01)

(58) Field of Classification Search
CPC . G06F 9/546; G06F 15/17375; G06N 3/0495; G06N 3/0499; G06N 3/09; G06N 3/098; G06N 3/084; G06N 3/045
See application file for complete search history.

(56) References Cited

U.S. PATENT DOCUMENTS

| | | | | |
|---|---|---|---|---|
| 9,710,265 | B1 * | 7/2017 | Temam | G06F 13/28 |
| 11,373,266 | B2 * | 6/2022 | Das | G06N 3/045 |
| 11,467,992 | B1 * | 10/2022 | Kaplan | G06N 3/045 |
| 11,556,450 | B2 * | 1/2023 | Venkataramani | G06F 11/3466 |
| 2019/0312772 | A1 * | 10/2019 | Zhao | G06F 9/5011 |
| 2020/0159589 | A1 * | 5/2020 | Capes | G06F 18/214 |
| 2020/0348662 | A1 * | 11/2020 | Cella | G05B 13/028 |

(Continued)

OTHER PUBLICATIONS

Patarasuk P, Yuan X. Bandwidth optimal all-reduce algorithms for clusters of workstations. Journal of Parallel and Distributed Computing. Feb. 1, 2009;69(2):117-24. (Year: 2009).*

(Continued)

*Primary Examiner* — James R Turchen

(57) ABSTRACT

In a data processing method in the field of artificial intelligence, a first processor of a data processing device sends a first search message to a second processor, and receives a second search message from a third processor. The first search message includes first data, and is for searching for an embedding parameter of the first data. The second search message includes second data and is for searching for an embedding parameter of the second data. The second processor and the third processor are respectively a next-hop processor and a previous-hop processor of the first processor in a ring communication architecture in which the first processor is located. The first, second, and third processors are among multiple processors in a data training system.

20 Claims, 19 Drawing Sheets

(56) References Cited

U.S. PATENT DOCUMENTS

| | | | | |
|---|---|---|---|---|
| 2021/0034978 | A1* | 2/2021 | Kato | G06N 3/0499 |
| 2021/0150037 | A1* | 5/2021 | Radhakrishnan | G06F 21/10 |
| 2021/0240543 | A1* | 8/2021 | Han | G06N 3/098 |
| 2021/0303505 | A1* | 9/2021 | Knowles | G06F 13/4068 |
| 2024/0394190 | A1* | 11/2024 | Zhang | G06F 12/0873 |

OTHER PUBLICATIONS

Wang Z, Wei Y, Lee M, Langer M, Yu F, Liu J, Liu S, Abel DG, Guo X, Dong J, Shi J. Merlin hugectr: Gpu-accelerated recommender system training and inference. InProceedings of the 16th ACM Conference on Recommender Systems Sep. 18, 2022 (pp. 534-537). (Year: 2022).*

Awan AA, Jain A, Anthony Q, Subramoni H, Panda DK. Hyparflow: Exploiting mpi and keras for scalable hybrid-parallel dnn training using tensorflow. arXiv preprint arXiv:1911.05146. Nov. 12, 2019. (Year: 2019).*

Salem Alqahtani, Murat Demirbas, Performance Analysis and Comparison of Distributed Machine Learning Systems, Sep. 4, 2019, total 11 pages.

Maxim Naumov et al., Deep Learning Recommendation Model for Personalization and Recommendation Systems, May 31, 2019, total 10 pages.

Weijie Zhao et al., Distributed Hierarchical Gpu Parameter Server for Massive Scale Deep Learning Ads Systems, Mar. 12, 2020, total 17 pages.

Long Ge from the flower-growing family, A Brief Discussion on the Distributed Architecture of TensorFlow: The Ring All-Reduce Algorithm, Jun. 19, 2019, total 18 pages.

* cited by examiner

| First batch of data | 21 | 5 | 14 | 25 |
|---|---|---|---|---|
| Process ID | 1 | 1 | 2 | 1 |
| Value range | | | | |

| Second batch of data | 19 | 2 | 10 | 32 |
|---|---|---|---|---|
| Process ID | 3 | 2 | 2 | 0 |
| Value range | | | | |

| Third batch of data | 13 | 8 | 16 | 29 |
|---|---|---|---|---|
| Process ID | 1 | 0 | 0 | 1 |
| Value range | | | | |

| Fourth batch of data | 6 | 33 | 18 | 4 |
|---|---|---|---|---|
| Process ID | 2 | 1 | 2 | 0 |
| Value range | | | | |

| Third batch of data | 13 | 8 | 16 | 29 |
|---|---|---|---|---|
| Process ID | 1 | 0 | 0 | 1 |
| Value range | | Parameter 8 | Parameter 9 | |

| Second batch of data | 19 | 2 | 10 | 32 |
|---|---|---|---|---|
| Process ID | 3 | 2 | 2 | 0 |
| Value range | Parameter 12 | Parameter 5 | Parameter 6 | |

| Fourth batch of data | 6 | 33 | 18 | 4 |
|---|---|---|---|---|
| Process ID | 2 | 1 | 2 | 0 |
| Value range | | Parameter 10 | | Parameter 1 |

| First batch of data | 21 | 5 | 14 | 25 |
|---|---|---|---|---|
| Process ID | 1 | 1 | 2 | 1 |
| Value range | Parameter 2 | Parameter 3 | Parameter 11 | Parameter 4 |

| Second batch of data | 19 | 2 | 10 | 32 |
|---|---|---|---|---|
| Process ID | 3 | 2 | 2 | 0 |
| Value range | Parameter 12 | Parameter 5 | Parameter 6 | Parameter 13 |

| First batch of data | 21 | 5 | 14 | 25 |
|---|---|---|---|---|
| Process ID | 1 | 1 | 2 | 1 |
| Value range | Parameter 2 | Parameter 3 | Parameter 11 | Parameter 4 |

| Third batch of data | 13 | 8 | 16 | 29 |
|---|---|---|---|---|
| Process ID | 1 | 0 | 0 | 1 |
| Value range | Parameter 7 | Parameter 8 | Parameter 9 | Parameter 14 |

| Fourth batch of data | 6 | 33 | 18 | 4 |
|---|---|---|---|---|
| Process ID | 2 | 1 | 2 | 0 |
| Value range | Parameter 15 | Parameter 10 | Parameter 16 | Parameter 1 |

| | | | | |
|---|---|---|---|---|
| First batch of data | 21 | 5 | 14 | 25 |
| Process ID | 1 | 1 | 2 | 1 |
| Value range | Parameter 2 | Parameter 3 | Parameter 11 | Parameter 4 |

| | | | | |
|---|---|---|---|---|
| Fourth batch of data | 6 | 33 | 18 | 4 |
| Process ID | 2 | 1 | 2 | 0 |
| Value range | Parameter 15 | Parameter 10 | Parameter 16 | Parameter 1 |

| | | | | |
|---|---|---|---|---|
| Second batch of data | 19 | 2 | 10 | 32 |
| Process ID | 3 | 2 | 2 | 0 |
| Value range | Parameter 12 | Parameter 5 | Parameter 6 | Parameter 13 |

| | | | | |
|---|---|---|---|---|
| Third batch of data | 13 | 8 | 16 | 29 |
| Process ID | 1 | 0 | 0 | 1 |
| Value range | Parameter 7 | Parameter 8 | Parameter 9 | Parameter 14 |

| | | | | |
|---|---|---|---|---|
| First batch of data | 21 | 5 | 14 | 25 |
| Process ID | 1 | 1 | 2 | 1 |
| Value range | Gradient 1 | Gradient 2 | Gradient 3 | Gradient 4 |

| | | | | |
|---|---|---|---|---|
| Fourth batch of data | 6 | 33 | 18 | 4 |
| Process ID | 2 | 1 | 2 | 0 |
| Value range | Gradient 13 | Gradient 14 | Gradient 15 | Gradient 16 |

| | | | | |
|---|---|---|---|---|
| Second batch of data | 19 | 2 | 10 | 32 |
| Process ID | 3 | 2 | 2 | 0 |
| Value range | Gradient 5 | Gradient 6 | Gradient 7 | Gradient 8 |

| | | | | |
|---|---|---|---|---|
| Third batch of data | 13 | 8 | 16 | 29 |
| Process ID | 1 | 0 | 0 | 1 |
| Value range | Gradient 9 | Gradient 10 | Gradient 11 | Gradient 12 |

| | | | | |
|---|---|---|---|---|
| Fourth batch of data | 6 | 33 | 18 | 4 |
| Process ID | 2 | 1 | 2 | 0 |
| Value range | Gradient 13 | Gradient 14 | Gradient 15 | Gradient 16 |

| | | | | |
|---|---|---|---|---|
| Third batch of data | 13 | 8 | 16 | 29 |
| Process ID | 1 | 0 | 0 | 1 |
| Value range | Gradient 9 | Gradient 10 | Gradient 11 | Gradient 12 |

| | | | | |
|---|---|---|---|---|
| First batch of data | 21 | 5 | 14 | 25 |
| Process ID | 1 | 1 | 2 | 1 |
| Value range | Gradient 1 | Gradient 2 | Gradient 3 | Gradient 4 |

| | | | | |
|---|---|---|---|---|
| Second batch of data | 19 | 2 | 10 | 32 |
| Process ID | 3 | 2 | 2 | 0 |
| Value range | Gradient 5 | Gradient 6 | Gradient 7 | Gradient 8 |

| | | | | |
|---|---|---|---|---|
| Third batch of data | 13 | 8 | 16 | 29 |
| Process ID | 1 | 0 | 0 | 1 |
| Value range | Gradient 9 | Gradient 10 | Gradient 11 | Gradient 12 |

| | | | | |
|---|---|---|---|---|
| Second batch of data | 19 | 2 | 10 | 32 |
| Process ID | 3 | 2 | 2 | 0 |
| Value range | Gradient 5 | Gradient 6 | Gradient 7 | Gradient 8 |

| | | | | |
|---|---|---|---|---|
| Fourth batch of data | 6 | 33 | 18 | 4 |
| Process ID | 2 | 1 | 2 | 0 |
| Value range | Gradient 13 | Gradient 14 | Gradient 15 | Gradient 16 |

| | | | | |
|---|---|---|---|---|
| First batch of data | 21 | 5 | 14 | 25 |
| Process ID | 1 | 1 | 2 | 1 |
| Value range | Gradient 1 | Gradient 2 | Gradient 3 | Gradient 4 |

| First batch of data | 21 | 5 | 14 | 25 |
|---|---|---|---|---|
| Process ID | 1 | 1 | 2 | 1 |
| Value range | Gradient 1 | Gradient 2 | Gradient 3 | Gradient 4 |

| Second batch of data | 19 | 2 | 10 | 32 |
|---|---|---|---|---|
| Process ID | 3 | 2 | 2 | 0 |
| Value range | Gradient 5 | Gradient 6 | Gradient 7 | Gradient 8 |

| Third batch of data | 13 | 8 | 16 | 29 |
|---|---|---|---|---|
| Process ID | 1 | 0 | 0 | 1 |
| Value range | Gradient 9 | Gradient 10 | Gradient 11 | Gradient 12 |

| Fourth batch of data | 6 | 33 | 18 | 4 |
|---|---|---|---|---|
| Process ID | 2 | 1 | 2 | 0 |
| Value range | Gradient 13 | Gradient 14 | Gradient 15 | Gradient 16 |

DATA PROCESSING METHOD AND APPARATUS, AND SYSTEM

CROSS-REFERENCE TO RELATED APPLICATIONS

This application is a continuation of International Application PCT/CN2022/085353, filed on Apr. 6, 2022, which claims priority to Chinese Patent Application No. 202110477608.3, filed on Apr. 29, 2021. The disclosures of the aforementioned applications are hereby incorporated by reference in their entirety.

TECHNICAL FIELD

This application relates to the field of artificial intelligence technologies, and in particular, to a large-scale data processing method and apparatus, and a system.

BACKGROUND

Artificial intelligence (AI) refers to a theory, method, technology, and application system that are used to simulate, extend, and expand human intelligence by using a digital computer or a machine controlled by the digital computer, to perceive an environment, obtain knowledge, and obtain an optimal result by using the knowledge. In other words, artificial intelligence is a branch of computer science and attempts to understand essence of intelligence and produce a new intelligent machine that can react in a manner similar to human intelligence. Artificial intelligence is to research design principles and implementation methods of various intelligent machines, so that the machines have perception, inference, and decision-making functions. Research in the artificial intelligence field includes robotics, natural language processing, computer vision, decision-making and inference, human-computer interaction, recommendation and search, AI basic theories, and the like.

In the AI field, large-scale data model training is a core technology widely used in scenarios such as Internet search, advertisement, and recommendation services. A typical application scenario includes, for example, a click-through rate (CTR) estimation model. Specifically, during large-scale data training, sample data is first input. Most of the sample data is data. The data cannot be numerically calculated. Therefore, the sample data needs to be converted into values through embedding. Therefore, an entry operator of a large-scale data training model is an embedding operator. After an operation at an embedding layer is performed, a loss function can be obtained after operations at several fully connected layers and an activation function are performed, and then back propagation is performed by using the loss function, that is, a step of training process is completed. Currently, to improve a training speed of large-scale data, a graphics processing unit (GPU) or a neural-network processing unit (NPU) may be used to accelerate model training.

If the GPU or the NPU is used for training, a single device cannot train the model because an embedding parameter scale is huge, for example, 10 TB (for example, device memory of a typical GPU is only 16 GB to 32 GB). Therefore, a data parallel plus model parallel training manner is a mainstream solution to this problem in the industry. However, during model parallel training, data communication needs to be performed between processes corresponding to parallel models to cooperate with each other. A communication process increases training time and reduces training efficiency. In conclusion, how to further improve training efficiency when the large-scale data training model is trained through model parallel training is a technical problem that needs to be resolved by a person skilled in the art.

SUMMARY

This application discloses a data processing method and apparatus, and a system, to improve training efficiency and performance of a data training model.

According to a first aspect, this application provides a data processing method. The method includes:

A first processor sends a first search message to a second processor, where the first search message includes first data, and the first search message is used to search for an embedding parameter of the first data; and the second processor is a next-hop processor of the first processor in a ring communication architecture in which the first processor is located.

The first processor receives a second search message from a third processor, where the second search message includes second data, and the second search message is used to search for an embedding parameter of the second data; and the third processor is a previous-hop processor of the first processor in the ring communication architecture.

The first processor, the second processor, and the third processor are processors in N processors included in the data training system, where N is an integer greater than or equal to 3; and the N processors communicate with each other by using the ring communication architecture, and in the ring communication architecture, each of the N processors receives a message only from a previous-hop processor of each processor and sends a message only to a next-hop processor of each processor.

In this implementation of this application, the data training system includes the N processors. To train large-scale sample data, the data training system including the N processors implements data training in a data parallel plus model parallel manner. Based on the data parallel plus model parallel training manner, some sample data is randomly obtained separately on the N processors for training, and after the trained data is input to a training model, data needs to be mapped to a dense vector (also referred to as an embedding parameter) at an embedding (layer before being used for subsequent calculation. However, because data trained on one processor is randomly obtained, embedding parameters of the data do not necessarily exist in the processor, and corresponding embedding parameters need to be obtained from other processors of the N processors. In this case, message communication needs to be performed with the other processors. In this embodiment of this application, in a process in which message communication is performed at the embedding layer to search for the embedding parameter of the data, the N processors implement ring message communication by using the ring communication architecture. Compared with a many-to-many message communication manner in a solution in a conventional technology, this manner in this application can fully utilize bandwidth resources between the processors, avoid a single-point communication bottleneck, reduce a communication latency, and improve communication efficiency, to improve training efficiency and performance of the entire data training system.

In a possible implementation, the method further includes: When embedding parameters of some or all data in the second data are found based on the second search message, the first processor adds the embedding parameters of the some or all data to the second search message to obtain a third search message, and sends the third search message to the second processor. Alternatively, the first processor sends the second search message to the second processor when an embedding parameter of the second data is not found based on the second search message.

In this implementation of this application, after receiving a search message of the embedding parameter of the data, the processor continues to forward the search message to the next-hop processor based on the ring communication architecture regardless of whether the corresponding embedding parameter of the data is found locally. Therefore, the processor can finally find, through cyclic forwarding and search, the embedding parameters of all the data that are required by the processor.

In a possible implementation, when embedding parameters of some or all data in the second data are found based on the second search message, that the first processor adds the embedding parameters of the some or all data to the second search message to obtain a third search message, and sends the third search message to the second processor includes:

The first processor searches a first embedding table for embedding parameters to which the some or all data is mapped, where the first embedding table is an embedding table that is maintained by the first processor and that is used to store data and an embedding parameter, and there is a one-to-one mapping relationship between data and an embedding parameter in the first embedding table.

The first processor adds, to value ranges corresponding to the some or all data in the second search message, the embedding parameters to which the some or all data is mapped, to obtain the third search message.

The first processor sends the third search message to the second processor, where the third search message is used to search for an embedding parameter of data whose embedding parameter is not found in the second data.

In this implementation of this application, each of the N processors maintains one embedding table, where the embedding table is used to store data and a corresponding embedding parameter. Therefore, after receiving a search message of the embedding parameter, the processor can use the data in the search message as an index for searching in the embedding table of the processor. If the data in the search message exists in the embedding table, the corresponding embedding parameter can be found.

In a possible implementation, when embedding parameters of some or all data in the second data are found based on the second search message, that the first processor adds the embedding parameters of the some or all data to the second search message to obtain a third search message, and sends the third search message to the second processor includes: The first processor determines that the some or all data belongs to the first embedding table, and the first embedding table does not include the some or all data, where the first embedding table is an embedding table that is maintained by the first processor and that is used to store data and an embedding parameter, and there is a one-to-one mapping relationship between data and an embedding parameter in the first embedding table.

The first processor generates embedding parameters respectively corresponding to the some or all data.

The first processor adds, to value ranges corresponding to the some or all data in the second search message, the embedding parameters respectively corresponding to the some or all data, to obtain the third search message.

The first processor sends the third search message to the second processor, where the third search message is used to search for an embedding parameter of data whose embedding parameter is not found in the second data.

In this implementation of this application, each of the N processors maintains one embedding table, where the embedding table is used to store data and a corresponding embedding parameter. Therefore, after the processor receives a search message of the embedding parameter, if the processor determines that data in the message belongs to the embedding table of the processor, but is not in the embedding table, the processor may randomly generate a corresponding embedding parameter for the data belonging to the embedding table. Optionally, a remainder obtained by performing a modulo operation of the data belonging to the embedding table mod N is the same as a rank of a training process run by the processor.

In a possible implementation, that the first processor sends the second search message to the second processor when an embedding parameter of the second data is not found based on the second search message includes:

The first processor sends the second search message to the second processor when none of the second data belongs to data in a first embedding table, where the first embedding table is an embedding table that is maintained by the first processor and that is used to store data and an embedding parameter, and there is a one-to-one mapping relationship between data and an embedding parameter in the first embedding table.

In this implementation of this application, if a search message that is of the embedding parameter of the data and that is received by the processor does not include the data belonging to the embedding table of the processor, the processor directly sends the received search message to the next-hop processor based on the ring communication architecture.

In a possible implementation, the method further includes:

The first processor receives a fourth search message from the third processor, where the fourth search message includes third data and an embedding parameter to which a first part of data in the third data is mapped, and the fourth search message is used to search for an embedding parameter to which data other than the first part of data in the third data is mapped.

When an embedding parameter of a second part of data in the third data is found based on the fourth search message, the first processor adds the embedding parameter of the second part of data to the fourth search message to obtain a fifth search message, and sending the fifth search message to the second processor.

Alternatively, the first processor sends the fourth search message to the second processor when an embedding parameter of the third data is not found based on the fourth search message.

In this implementation of this application, the ring communication architecture is used to search for the embedding parameter required by each of the N processors, and ring communication of a search message may be implemented based on the architecture for a plurality of times to search for the embedding parameter of the data, for example, message communication and search for the embedding parameter may be cyclically performed between the N processors for at least N times, to ensure that all the processors can obtain the required embedding parameters of all the data.

In a possible implementation, the method further includes: The first processor receives a sixth search message from the third processor, where the sixth search message includes the first data and the embedding parameter of the first data.

In this implementation of this application, message communication between the N processors is implemented based on the ring communication architecture to search for an embedding parameter required by each processor. After a plurality of cycles, the processor may receive, from the previous-hop processor, a message that includes all the required embedding parameters.

According to a second aspect, this application provides a data processing method. The method includes:

A first processor sends a first notification message to a second processor, where the first notification message includes first data and a first gradient, and is used to propagate the first gradient to a first target processor; the first gradient is a gradient corresponding to an embedding parameter of the first data; and the second processor is a next-hop processor of the first processor in a ring communication architecture in which the first processor is located.

The first processor receives a second notification message from a third processor, where the second notification message includes second data and a second gradient, and is used to propagate the second gradient to a second target processor; the second gradient is a gradient corresponding to an embedding parameter of the second data; and the third processor is a previous-hop processor of the first processor in the ring communication architecture.

The first processor, the second processor, and the third processor are processors in N processors included in the data training system, where N is an integer greater than or equal to 3; and the N processors communicate with each other by using the ring communication architecture, and in the ring communication architecture, each of the N processors receives a message only from a previous-hop processor of each processor and sends a message only to a next-hop processor of each processor.

In this implementation of this application, in a forward propagation process of training data by the processor, an embedding parameter of data is obtained from another processor, that is, the embedding parameter of the data is stored in the another processor. In a back propagation process of training, the embedding parameter of the data needs to be optimized based on a gradient obtained through calculation. In this case, the processor needs to send, to a corresponding processor, the gradient that is obtained through calculation and that corresponds to the embedding parameter of the data, so that the corresponding processor optimizes the embedding parameter of the data. In this embodiment of this application, in a process in which message communication is performed in a back propagation process at an embedding layer to obtain gradients that are of embedding parameters and that are respectively required, the N processors implement ring message communication by using the ring communication architecture. Compared with a many-to-many message communication manner in a solution in a conventional technology, this manner in this application can fully utilize bandwidth resources between the processors, avoid a single-point communication bottleneck, reduce a communication latency, and improve communication efficiency, to improve training efficiency and performance of the entire data training system.

In a possible implementation, the method further includes: When the second notification message includes a first target gradient, the first processor obtains the first target gradient from the second notification message, and sends the second notification message to the second processor, where the first target gradient is a gradient of an embedding parameter in a first embedding table maintained by the first processor, and there is a one-to-one mapping relationship between data and an embedding parameter in the first embedding table.

Alternatively, the first processor sends the second notification message to the second processor when the second notification message does not include the first target gradient.

In this implementation of this application, after receiving a notification message of a gradient, the processor continues to forward the notification message to the next-hop processor based on the ring communication architecture regardless of whether the processor finds a gradient required by the processor in the notification message. Therefore, each processor can finally obtain a required gradient through cyclic forwarding.

In a possible implementation, when the second notification message includes a first target gradient, that the first processor obtains the first target gradient from the second notification message includes:

The first processor determines that some or all data in the second data is the data in the first embedding table.

The first processor obtains the first target gradient from the second notification message based on the some or all data.

In this implementation of this application, each of the N processors maintains one embedding table, where the embedding table is used to store data and a corresponding embedding parameter. Therefore, after the processor receives a notification message of a gradient, if data exists in the embedding table in the message, the processor may obtain a corresponding gradient from the message, to optimize the data.

In a possible implementation, the method further includes:

The first processor receives a third notification message from the third processor, where the third notification message includes third data and a third gradient, and is used to propagate the third gradient to a third target processor; and the third gradient is a gradient corresponding to an embedding parameter of the third data.

When the third notification message includes a second target gradient, the first processor obtains the second target gradient from the third notification message, and sends the third notification message to the second processor, where the second target gradient is a gradient of an embedding parameter in the first embedding table maintained by the first processor, and the first embedding table includes a mapping relationship between data and an embedding parameter of the data.

Alternatively, the first processor sends the third notification message to the second processor when the third notification message does not include the second target gradient.

In this implementation of this application, based on the ring communication architecture, each of the N processors obtains a required gradient, and ring communication of a notification message may be implemented based on the architecture for a plurality of times, for example, message communication may be cyclically performed between the N processors for at least N−1 times, to ensure that all the processors can obtain all required gradients.

It should be noted that any one of the first aspect and the possible implementations of the first aspect may be implemented in combination with any one of the second aspect and the possible implementations of the second aspect. Any one of the first aspect and the possible implementations of the first aspect is applied to the forward propagation process at the embedding layer for data training, and any one of the second aspect and the possible implementations of the second aspect is applied to the back propagation process of the embedding layer for data training.

According to a third aspect, this application provides a data processing apparatus. The apparatus includes:

a sending unit, configured to send a first search message to a second processor, where the first search message includes first data, and the first search message is used to search for an embedding parameter of the first data; and the second processor is a next-hop processor of the first processor in a ring communication architecture in which the first processor is located; and a receiving unit, configured to receive a second search message from a third processor, where the second search message includes second data, and the second search message is used to search for an embedding parameter of the second data; and the third processor is a previous-hop processor of the first processor in the ring communication architecture.

The first processor, the second processor, and the third processor are processors in N processors included in the data training system, where N is an integer greater than or equal to 3; and the N processors communicate with each other by using the ring communication architecture, and in the ring communication architecture, each of the N processors receives a message only from a previous-hop processor of each processor and sends a message only to a next-hop processor of each processor.

In a possible implementation, the apparatus further includes an adding unit.

When embedding parameters of some or all data in the second data are found based on the second search message, the adding unit is configured to add the embedding parameters of the some or all data to the second search message to obtain a third search message.

The sending unit is further configured to send the third search message to the second processor.

Alternatively, the sending unit is further configured to send the second search message to the second processor when an embedding parameter of the second data is not found based on the second search message.

In a possible implementation, the apparatus further includes a searching unit.

The searching unit is configured to search a first embedding table for embedding parameters to which the some or all data is mapped, where the first embedding table is an embedding table that is maintained by the first processor and that is used to store data and an embedding parameter, and there is a one-to-one mapping relationship between data and an embedding parameter in the first embedding table.

The adding unit is specifically configured to add, to value ranges corresponding to the some or all data in the second search message, the embedding parameters to which the some or all data is mapped, to obtain the third search message.

The sending unit is specifically configured to send the third search message to the second processor, where the third search message is used to search for an embedding parameter of data whose embedding parameter is not found in the second data.

In a possible implementation, the apparatus further includes a determining unit and a generation unit.

The determining unit is configured to determine that the some or all data belongs to the first embedding table, and the first embedding table does not include the some or all data, where the first embedding table is an embedding table that is maintained by the first processor and that is used to store data and an embedding parameter, and there is a one-to-one mapping relationship between data and an embedding parameter in the first embedding table.

The generation unit is configured to generate embedding parameters respectively corresponding to the some or all data.

The adding unit is specifically configured to add, to value ranges corresponding to the some or all data in the second search message, the embedding parameters respectively corresponding to the some or all data, to obtain the third search message.

The sending unit is specifically configured to send the third search message to the second processor, where the third search message is used to search for an embedding parameter of data whose embedding parameter is not found in the second data.

In a possible implementation, the sending unit is specifically configured to:

send the second search message to the second processor when none of the second data belongs to data in a first embedding table, where the first embedding table is an embedding table that is maintained by the first processor and that is used to store data and an embedding parameter, and there is a one-to-one mapping relationship between data and an embedding parameter in the first embedding table.

In a possible implementation, the receiving unit is further configured to receive a fourth search message from the third processor, where the fourth search message includes third data and an embedding parameter to which a first part of data in the third data is mapped, and the fourth search message is used to search for an embedding parameter to which data other than the first part of data in the third data is mapped.

The apparatus further includes the adding unit, and when an embedding parameter of a second part of data in the third data is found based on the fourth search message, the adding unit is configured to add the embedding parameter of the second part of data to the fourth search message to obtain a fifth search message.

The sending unit is further configured to send the fifth search message to the second processor.

Alternatively, the sending unit is further configured to send the fourth search message to the second processor when an embedding parameter of the third data is not found based on the fourth search message.

In a possible implementation, the receiving unit is further configured to: receive a sixth search message from the third processor, where the sixth search message includes the first data and the embedding parameter of the first data.

According to a fourth aspect, this application provides a data processing apparatus. The apparatus includes:

a sending unit, configured to send a first notification message to a second processor, where the first notification message includes first data and a first gradient, and is used to propagate the first gradient to a first target processor; the first gradient is a gradient corresponding to an embedding parameter of the first data; and the second processor is a next-hop processor of the first processor in a ring communication architecture in which the first processor is located; and a receiving unit, configured to receive a second notification message from a third processor, where the second notification message includes second data and a second gradient, and is used to propagate the second gradient to a second target processor; the second gradient is a gradient corresponding to an embedding parameter of the second data; and the third processor is a previous-hop processor of the first processor in the ring communication architecture.

The first processor, the second processor, and the third processor are processors in N processors included in the data training system, where N is an integer greater than or equal to 3; and the N processors communicate with each other by using the ring communication architecture, and in the ring communication architecture, each of the N processors receives a message only from a previous-hop processor of each processor and sends a message only to a next-hop processor of each processor.

In a possible implementation, the apparatus further includes an obtaining unit.

When the second notification message includes a first target gradient, the obtaining unit is configured to obtain the first target gradient from the second notification message.

The sending unit is further configured to send the second notification message to the second processor, where the first target gradient is a gradient of an embedding parameter in a first embedding table maintained by the first processor, and there is a one-to-one mapping relationship between data and an embedding parameter in the first embedding table.

Alternatively, the sending unit is further configured to send the second notification message to the second processor when the second notification message does not include the first target gradient.

In a possible implementation, the obtaining unit is specifically configured to:

determine that some or all data in the second data is the data in the first embedding table; and obtain the first target gradient from the second notification message based on the some or all data.

In a possible implementation, the receiving unit is further configured to receive a third notification message from the third processor, where the third notification message includes third data and a third gradient, and is used to propagate the third gradient to a third target processor; and the third gradient is a gradient corresponding to an embedding parameter of the third data.

The apparatus further includes the obtaining unit, and when the third notification message includes a second target gradient, the obtaining unit is configured to obtain the second target gradient from the third notification message.

The sending unit is further configured to send the third notification message to the second processor, where the second target gradient is a gradient of an embedding parameter in the first embedding table maintained by the first processor, and the first embedding table includes a mapping relationship between data and an embedding parameter of the data.

Alternatively, the sending unit is further configured to send the third notification message to the second processor when the third notification message does not include the second target gradient.

According to a fifth aspect, this application provides an apparatus. The apparatus may include a processor and a memory, to implement the data processing method according to the first aspect. The memory is coupled to the processor. When executing a computer program stored in the memory, the processor can implement the method according to any one of the first aspect or the possible implementations of the first aspect. The apparatus may further include a communication interface. The communication interface is used by the apparatus to communicate with another apparatus. For example, the communication interface may be a transceiver, a circuit, a bus, a module, or another type of communication interface. The communication interface includes a receiving interface and a sending interface. The receiving interface is configured to receive a message, and the sending interface is configured to send a message.

In a possible implementation, the apparatus may include:

The memory is configured to store the computer program.

The processor is configured to: send a first search message to a second processor through the sending interface, where the first search message includes first data, and the first search message is used to search for an embedding parameter of the first data; and the second processor is a next-hop processor of the first processor in a ring communication architecture in which the first processor is located; and receive a second search message from a third processor through the receiving interface, where the second search message includes second data, and the second search message is used to search for an embedding parameter of the second data; and the third processor is a previous-hop processor of the first processor in the ring communication architecture.

The first processor, the second processor, and the third processor are processors in N processors included in the data training system, where N is an integer greater than or equal to 3; and the N processors communicate with each other by using the ring communication architecture, and in the ring communication architecture, each of the N processors receives a message only from a previous-hop processor of each processor and sends a message only to a next-hop processor of each processor.

It should be noted that, in this application, the computer program in the memory may be pre-stored, or may be downloaded from the Internet and stored when the apparatus is used. A source of the computer program in the memory is not specifically limited in this application. The coupling in this embodiment of this application may be indirect coupling or a connection between apparatuses, units, or modules in an electrical form, a mechanical form, or another form, and is used for information exchange between the apparatuses, the units, or the modules.

According to a sixth aspect, this application provides an apparatus. The apparatus may include a processor and a memory, to implement the data processing method according to the second aspect. The memory is coupled to the processor. When executing a computer program stored in the memory, the processor can implement the method according to any one of the second aspect or the possible implementations of the second aspect. The apparatus may further include a communication interface. The communication interface is used by the apparatus to communicate with another apparatus. For example, the communication interface may be a transceiver, a circuit, a bus, a module, or another type of communication interface. The communication interface includes a receiving interface and a sending interface. The receiving interface is configured to receive a message, and the sending interface is configured to send a message.

In a possible implementation, the apparatus may include:

The memory is configured to store the computer program.

The processor is configured to: send a first notification message to a second processor through the sending interface, where the first notification message includes first data and a first gradient, and is used to propagate the first gradient to a first target processor; the first gradient is a gradient corresponding to an embedding parameter of the first data; and the second processor is a next-hop processor of the first processor in a ring communication architecture in which the first processor is located; and receive a second notification message from a third processor through the receiving interface, where the second notification message includes second data and a second gradient, and is used to propagate the second gradient to a second target processor; the second gradient is a gradient corresponding to an embedding parameter of the second data; and the third processor is a previous-hop processor of the first processor in the ring communication architecture.

The first processor, the second processor, and the third processor are processors in N processors included in the data training system, where N is an integer greater than or equal to 3; and the N processors communicate with each other by using the ring communication architecture, and in the ring communication architecture, each of the N processors receives a message only from a previous-hop processor of each processor and sends a message only to a next-hop processor of each processor.

It should be noted that, in this application, the computer program in the memory may be pre-stored, or may be downloaded from the Internet and stored when the apparatus is used. A source of the computer program in the memory is not specifically limited in this application. The coupling in this embodiment of this application may be indirect coupling or a connection between apparatuses, units, or modules in an electrical form, a mechanical form, or another form, and is used for information exchange between the apparatuses, the units, or the modules.

According to a seventh aspect, this application provides a data training system. The system includes N processors, where N is an integer greater than or equal to 3. The N processors communicate with each other by using a ring communication architecture, and in the ring communication architecture, each of the N processors receives a message only from a previous-hop processor of each processor and sends a message only to a next-hop processor of each processor. Each of the N processors may be the apparatus according to any one of the third aspect or the possible implementations of the third aspect. Alternatively, each of the N processors may be the apparatus according to any one of the fourth aspect or the possible implementations of the fourth aspect. Alternatively, each of the N processors may be the apparatus according to any one of the fifth aspect or the possible implementations of the fifth aspect. Alternatively, each of the N processors may be the apparatus according to any one of the sixth aspect or the possible implementations of the sixth aspect.

According to an eighth aspect, this application provides a computer-readable storage medium. The computer-readable storage medium stores a computer program, and the computer program is executed by a processor to implement the method according to any one of the first aspect or the possible implementations of the first aspect; or the computer program is executed by a processor to implement the method according to any one of the second aspect or the possible implementations of the second aspect.

According to a ninth aspect, this application provides a computer program product. When the computer program product is executed by a processor, the method according to any one of the first aspect or the possible implementations of the first aspect is to be performed; or the method according to any one of the second aspect or the possible implementations of the second aspect is to be performed.

The solutions provided in the third aspect to the ninth aspect are used to implement or cooperate with the methods correspondingly provided in the first aspect and the second aspect. Therefore, the solutions may achieve same or corresponding beneficial effects as the corresponding methods in the first aspect and the second aspect. Details are not described herein again.

BRIEF DESCRIPTION OF DRAWINGS

The following describes accompanying drawings used in embodiments of this application.

DESCRIPTION OF EMBODIMENTS

The following describes the technical solutions in embodiments of this application with reference to the accompanying drawings in embodiments of this application. It is clear that the described embodiments are merely some rather than all of embodiments of this application. All other embodiments obtained by a person of ordinary skill in the art based on embodiments of this application without creative efforts shall fall within the protection scope of this application.

Figure 1:
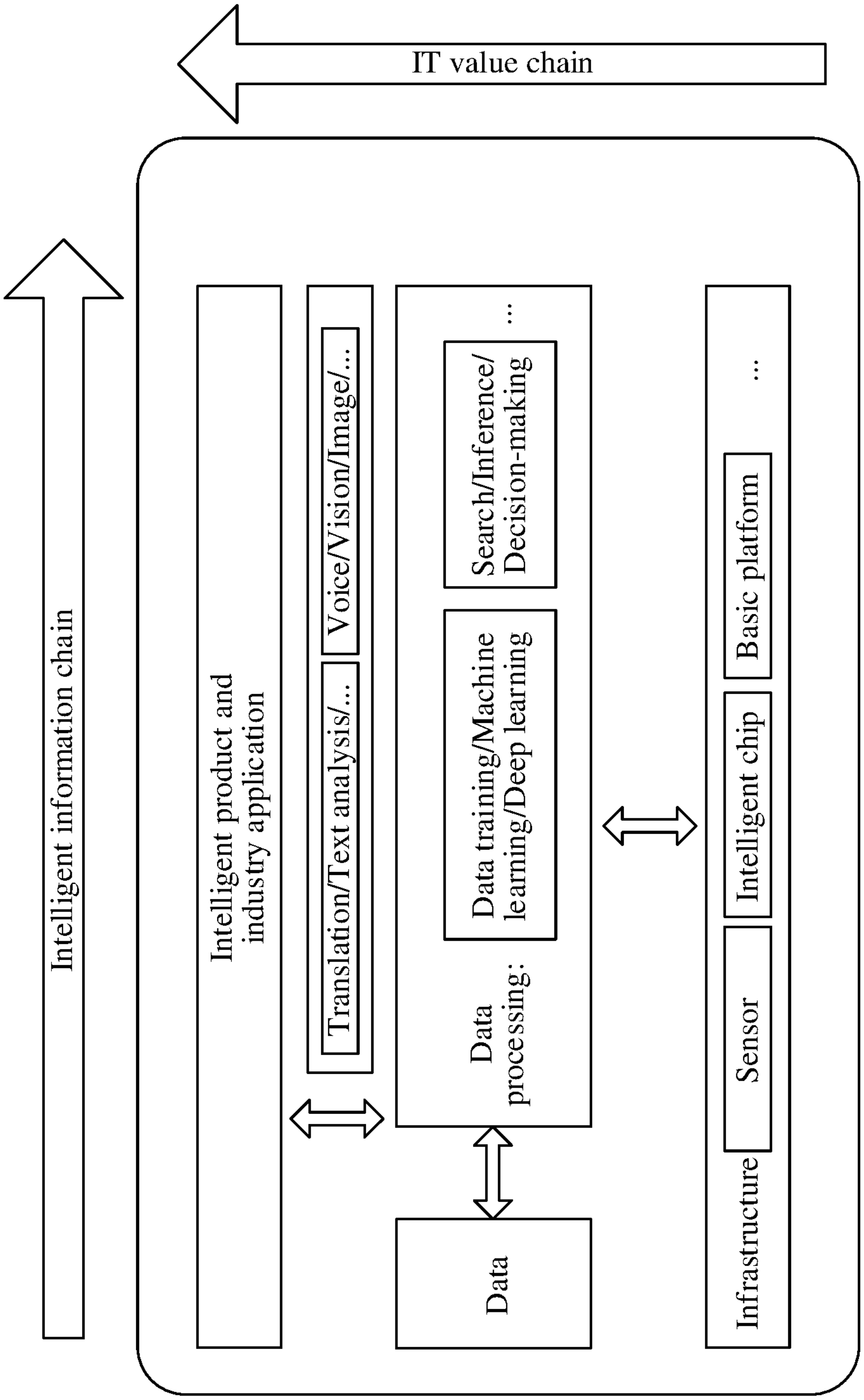
FIG. 1 is a schematic diagram of an artificial intelligence main framework according to an embodiment of this application.

FIG. 1 is a schematic diagram of an artificial intelligence main framework. The main framework describes an overall working procedure of an artificial intelligence system, and is applicable to a general requirement of the artificial intelligence field.

The following describes the foregoing artificial intelligence main framework from two dimensions of an "intelligent information chain" (a horizontal axis) and an "IT value chain" (a vertical axis).

The "intelligent information chain" reflects a series of processes from data obtaining to processing. For example, the process may be a general process of intelligent information perception, intelligent information representation and formation, intelligent inference, intelligent decision-making, and intelligent execution and output. In this process, the data undergoes a refinement process of "data-information-knowledge-intelligence".

The "IT value chain" reflects a value brought by artificial intelligence to the information technology industry from an underlying infrastructure and information (technology providing and processing implementation) of artificial intelligence to an industrial ecological process of a system.

(1) Infrastructure

The infrastructure provides computing capability support for the artificial intelligence system, implements communication with an external world, and implements support through a basic platform. The infrastructure communicates with the outside through a sensor. A computing capability is provided by an intelligent chip (a hardware acceleration chip such as a CPU, an NPU, a GPU, an ASIC, or an FPGA). The basic platform includes related platforms such as a distributed computing framework and a network for assurance and support, including cloud storage and computing, an interconnection network, and the like. For example, the sensor communicates with the outside to obtain data, and the data is provided to an intelligent chip in a distributed computing system provided by the basic platform for computing.

(2) Data

Data at an upper layer of the infrastructure indicates a data source in the artificial intelligence field. The data relates to a graph, an image, a voice, and a text, further relates to Internet of things data of a conventional device, and includes service data of an existing system and perception data such as force, displacement, a liquid level, a temperature, and humidity.

(3) Data Processing

Data processing usually includes a manner such as data training, machine learning, deep learning, searching, inference, or decision-making.

Machine learning and deep learning may be performing symbolic and formalized intelligent information modeling, extraction, preprocessing, training, and the like on data.

Inference is a process in which a human intelligent inference manner is simulated in a computer or an intelligent system, and machine thinking and problem resolving are performed by using formal information based on an inference control policy. A typical function is searching and matching.

Decision-making is a process in which a decision is made after intelligent information is inferred, and usually provides functions such as classification, ranking, and prediction.

(4) General Capability

After data processing mentioned above is performed on data, some general capabilities may be further formed based on a data processing result, for example, an algorithm or a general system such as translation, text analysis, computer vision processing, speech recognition, and image recognition.

(5) Intelligent Product and Industry Application

The intelligent product and industry application are a product and an application of the artificial intelligence system in various fields, and are a package of an overall solution of the artificial intelligence, so that decision-making for intelligent information is productized and an application is implemented. Application fields thereof mainly include intelligent manufacturing, intelligent transportation, intelligent home, intelligent healthcare, intelligent security protection, autonomous driving, a safe city, an intelligent terminal, and the like.

Figure 2:
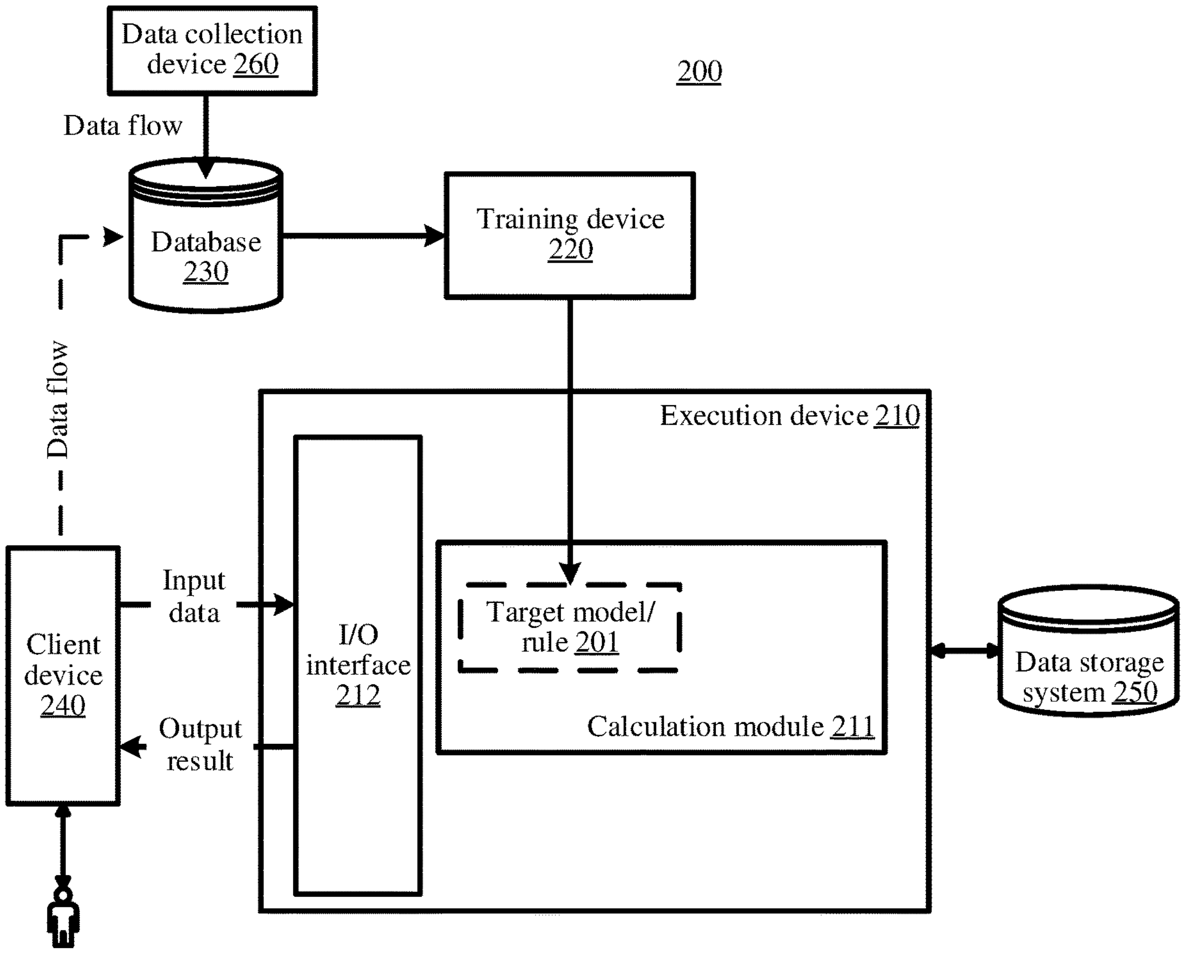
FIG. 2 is a schematic diagram of an application environment according to an embodiment of this application.

Refer to FIG. 2. An embodiment of this application provides a system architecture 200. A data collection device 260 is configured to: collect trained sample data and store the sample data in a database 230. A training device 220 generates a target model/rule 201 based on the sample data maintained in the database 230. The following describes in more detail how the training device 220 obtains the target model/rule 201 based on the sample data. The target model/rule 201 can implement functions such as click-through rate estimation, information recommendation, or search.

Work at each layer of a deep neural network may be described by using a mathematical expression $\vec{y}=a(W\cdot\vec{x}+b)$. From a physical layer, work at each layer of the deep neural network may be understood as completing transformation from input space to output space (namely, from row space to column space of a matrix) by performing five operations on the input space (a set of input vectors). The five operations include: 1. dimension increasing/dimension reduction; 2. scaling up/scaling down; 3. rotation; 4. translation; and 5. "bending". The operations 1, 2, and 3 are completed by $W\cdot\vec{x}$, the operation 4 is completed by +b, and the operation 5 is implemented by a( ). The word "space" is used herein for expression because a classified object is not a single thing, but a type of thing. Space is a set of all individuals of such a type of thing. W is a weight vector, and each value in the vector indicates a weight value of one neuron at the layer of the neural network. The vector W determines space transformation from the input space to the output space described above. In other words, the weight W at each layer controls how to transform space. The deep neural network is trained to finally obtain a weight matrix (a weight matrix including vectors W at a plurality of layers) of all layers of the trained neural network. Therefore, a training process of the neural network is essentially a manner of learning of control of space transformation, and more specifically, learning of a weight matrix.

Because it is expected that an output of the deep neural network is as close as possible to a value that actually needs to be predicted, a current predicted value of the network and an actually expected target value may be compared, and then a weight vector at each layer of the neural network is updated based on a difference between the current predicted value and the target value (certainly, there is usually an initialization process before a first update, to be specific, parameters are preconfigured for all layers of the deep neural network). For example, if the predicted value of the network is large, the weight vector is adjusted to decrease the predicted value, and adjustment is continuously performed, until the neural network can predict the actually expected target value. Therefore, "how to obtain a difference between the predicted value and the target value through comparison" needs to be predefined. This is a loss function or an objective function. The loss function and the objective function are important equations for measuring the difference between the predicted value and the target value. The loss function is used as an example. A larger output value (loss) of the loss function indicates a larger difference. Therefore, training of the deep neural network is a process of minimizing the loss as much as possible.

The target model/rule obtained by the training device 220 may be applied to different systems or devices. In FIG. 2, an I/O interface 212 is configured in an execution device 210, to exchange data with an external device. A "user" may input data to the I/O interface 212 through a client device 240.

The execution device 210 may invoke data, code, and the like in a data storage system 250, and may further store data, instructions, and the like in the data storage system 250.

A calculation module 211 processes the input data by using the target model/rule 201. For example, in a click-through rate estimation scenario, the calculation module 211 predicts, by using the target model/rule 201, information that may be clicked by the user.

Finally, the I/O interface 212 returns a processing result to the client device 240 and provides the processing result for the user.

Further, the training device 220 may generate a corresponding target model/rule 201 based on different data for different targets, to provide a better result for the user.

In the case shown in FIG. 2, the user may manually specify data in the execution device 210, for example, operate in an interface provided by the I/O interface 212. In another case, the client device 240 may automatically input data to the I/O interface 212 and obtain a result. If it is required that the client device 240 needs to obtain authorization from the user to automatically input the data, the user may set corresponding permission in the client device 240. The user may view, on the client device 240, a result output by the execution device 210. Specifically, the result may be presented in a form of displaying, a sound, an action, or the like. Alternatively, the client device 240 may serve as a data collection end to store the collected sample data in a database 230.

It should be noted that FIG. 2 is merely a schematic diagram of a system architecture according to an embodiment of this application. A location relationship between a device, a component, a module, and the like shown in the figure constitutes no limitation. For example, in FIG. 2, the data storage system 250 is an external memory relative to the execution device 210. In another case, the data storage system 250 may alternatively be disposed in the execution device 210.

Figure 3:
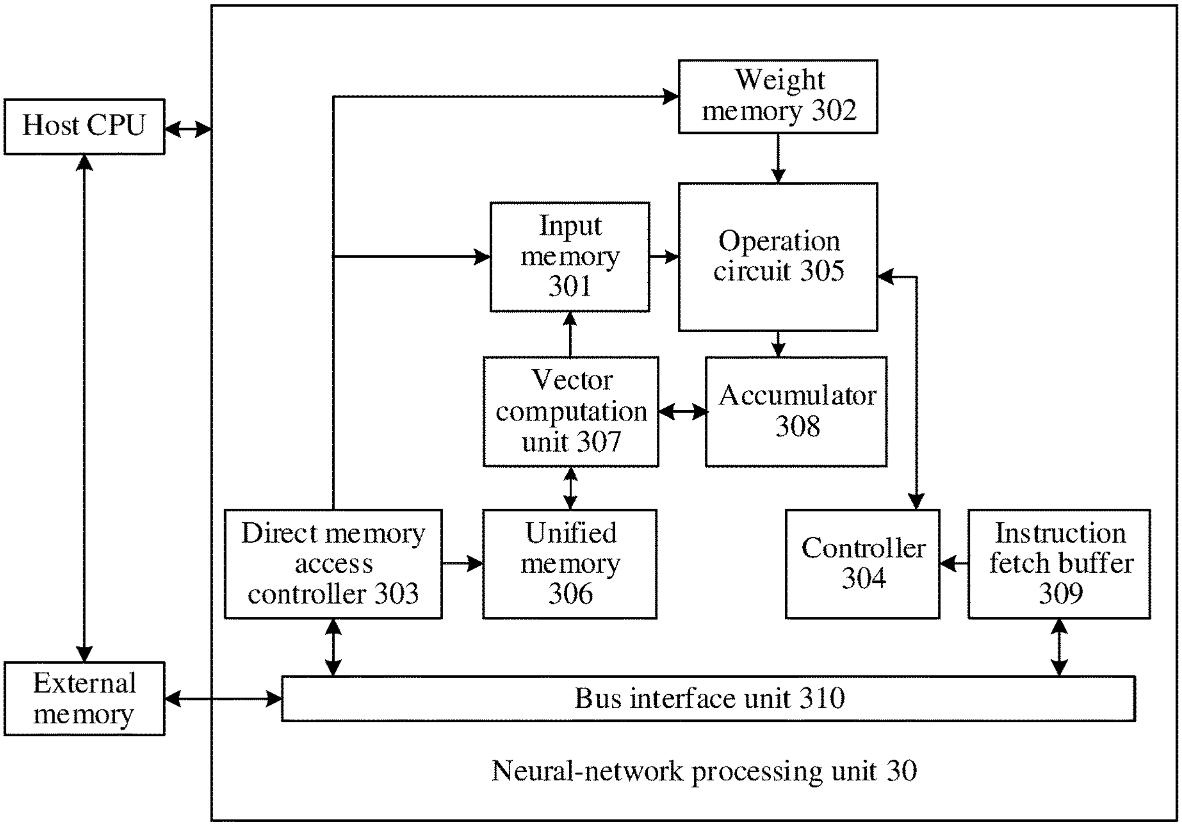
FIG. 3 is a schematic diagram of a structure of a neural network processor according to an embodiment of this application.

FIG. 3 is a structural diagram of chip hardware according to an embodiment of this application.

A neural-network processing unit NPU 30 serves as a coprocessor, and is mounted on a host central processing unit (Host CPU). The host CPU allocates a task. A core part of the NPU is an operation circuit 305, and a controller 304 controls the operation circuit 305 to extract matrix data in a memory and perform a multiplication operation.

In some implementations, a plurality of processing units (PE) are included inside the operation circuit 305. In some implementations, the operation circuit 305 is a two-dimensional systolic array. The operation circuit 305 may alternatively be a one-dimensional systolic array or another electronic circuit that can perform mathematical operations such as multiplication and addition. In some implementations, the operation circuit 305 is a general-purpose matrix processor.

For example, it is assumed that there is an input matrix A, a weight matrix B, and an output matrix C. The operation circuit fetches, from a weight memory 302, data corresponding to the matrix B, and caches the data on each PE in the operation circuit. The operation circuit fetches data of the matrix A from an input memory 301, to perform a matrix operation on the matrix B, and stores an obtained partial result or an obtained final result of the matrix in an accumulator 308.

A unified memory 306 is configured to store input data and output data. Weight data is directly transferred to the weight memory 302 through a direct memory access controller (DMAC) 303. The input data is also transferred to the unified memory 306 through the DMAC.

A BIU is a bus interface unit, that is, a bus interface unit 310, and is configured to interact with the DMAC and an instruction fetch buffer 309 through an AXI bus.

The bus interface unit 310 (BIU) is used by the instruction fetch buffer 309 to obtain instructions from an external memory, and is further used by the direct memory access controller 305 to obtain original data of the input matrix A or the weight matrix B from the external memory.

The DMAC is mainly configured to: transfer input data in the external memory to the unified memory 306, or transfer the weight data to the weight memory 302, or transfer the input data to the input memory 301.

A vector computation unit 307 includes a plurality of operation processing units. If required, further processing is performed on an output of the operation circuit, for example, vector multiplication, vector addition, an exponential operation, a logarithmic operation, or a value comparison. For example, the vector computation unit is mainly configured to perform network computation such as pooling, batch normalization, or local response normalization at a non-convolutional layer in the neural network.

In some implementations, the vector computation unit 307 stores a processed output vector in a unified memory 306. For example, the vector computation unit 307 may apply a non-linear function to the output of the operation circuit 305, for example, a vector of an accumulated value, to generate an activation value. In some implementations, the vector computation unit 307 generates a normalized value, a combined value, or both a normalized value and a combined value. In some implementations, the processed output vector can be used as an activation input into the operation circuit 305, for example, to be used at a subsequent layer of the neural network.

The instruction fetch buffer 309 connected to the controller 304 is configured to store instructions used by the controller 304.

The unified memory 306, the input memory 301, the weight memory 302, and the instruction fetch buffer 309 are all on-chip memories. The external memory is private for a hardware architecture of the NPU.

Figure 4:
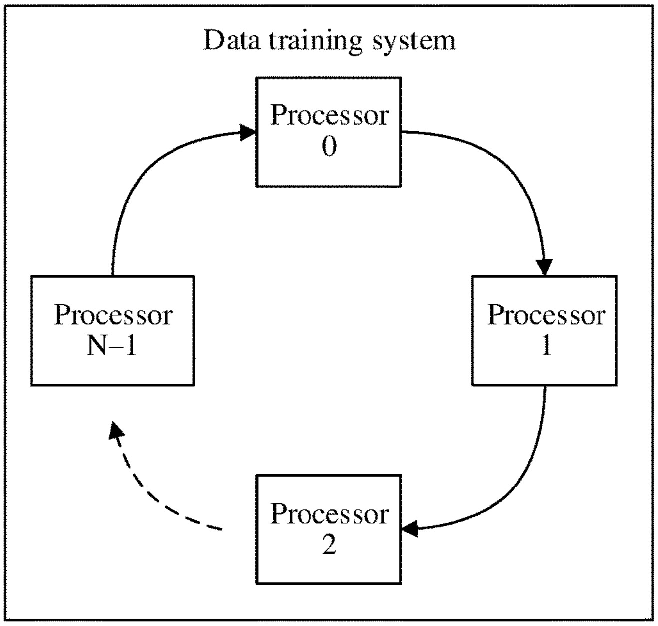
FIG. 4 is a schematic diagram of a data training system according to an embodiment of this application.

FIG. 4 is a schematic diagram of a data training system according to this application. The system includes N processors, where N is an integer greater than 1. For example, the N processors may be the training device 220 in FIG. 2.

In a data training process, the N processors may implement message communication by using a ring communication architecture. The ring communication architecture is a logical architecture for implementing ring communication between the N processors. In the ring communication architecture, each of the N processors receives a message only from a previous-hop processor of each processor and sends a message only to a next-hop processor of each processor. To facilitate understanding of a communication manner based on the ring communication architecture, assuming that N is 4, a processor 0 sends a message only to a processor 1 and receives a message only from a processor 3; the processor 1 sends a message only to a processor 2 and receives a message only from the processor 0; the processor 2 sends a message only to the processor 3 and receives a message only from the processor 1; and the processor 3 sends a message only to the processor 0 and receives a message only from the processor 2.

In this application, in a process in which the N processors implement message communication by using the ring communication architecture, a processor i (except i=N−1) in the N processors is a previous-hop processor of a processor i+1, and the processor N−1 is a previous-hop processor of a processor 0. The processor i (except i=0) in the N processors is a next-hop processor of a processor i−1, the processor 0 is a next-hop processor of the processor N−1, where i is an integer between 0 and N−1.

For example, the ring communication manner based on the ring communication architecture may be implemented through ring communication in a message passing interface (MPI).

It should be noted that, in the data training process, the N processors may implement message communication in the entire process by using the ring communication architecture. Alternatively, only partial message communication may be implemented by using the ring communication architecture, where partial messages include, for example, a message used to search for an embedding parameter of data in a forward propagation process at an embedding layer, and/or include a message used to obtain a gradient of an optimized embedding parameter in a back propagation process at the embedding layer. Other message communication may be performed in another communication manner. This is not limited in this application.

In a possible implementation, the embedding parameter is in a form of a vector, and the embedding parameter may be referred to as an embedding vector. The gradient may also be in a form of a vector, and the gradient may also be referred to as a gradient vector.

For example, all the N processors may be graphics processing units (GPU). Alternatively, all the N processors may be neural-network processing units (NPU). Alternatively, some of the N processors may be GPUs and the other processors may be NPUs. The NPU may be the neural-network processing unit in FIG. 3. It should be noted that, the N processors are not limited to GPUs or NPUs, or may be other high-speed processors.

In this application, the data training system may be applied to a scenario in which a quantity of training embedding parameters reaches a level of 10 billions or even 100 billions. For example, the data training system may be applied to actual application scenarios such as information search, information recommendation, and advertisements, such as click-through rate (CTR) estimation. It should be noted that, the data trained by the data training system may be sparse data or dense data. This is not limited in this application.

For example, the data that needs to be trained may be identity (id) data, and the id data may be a number, a character string, or the like. For example, in an application scenario of commodity recommendation, the id data may be an identification code of a commodity, an address of a merchant store, or the like. The following mainly describes, by using an example in which the data that needs to be trained is the id data, a data processing method provided in this application. However, the data processing method provided in this application may also implement processing of another type of data, which is not limited to the id data.

Because a large amount of data needs to be trained in a training process, a data parallel plus model parallel manner is used for training.

Figure 5:
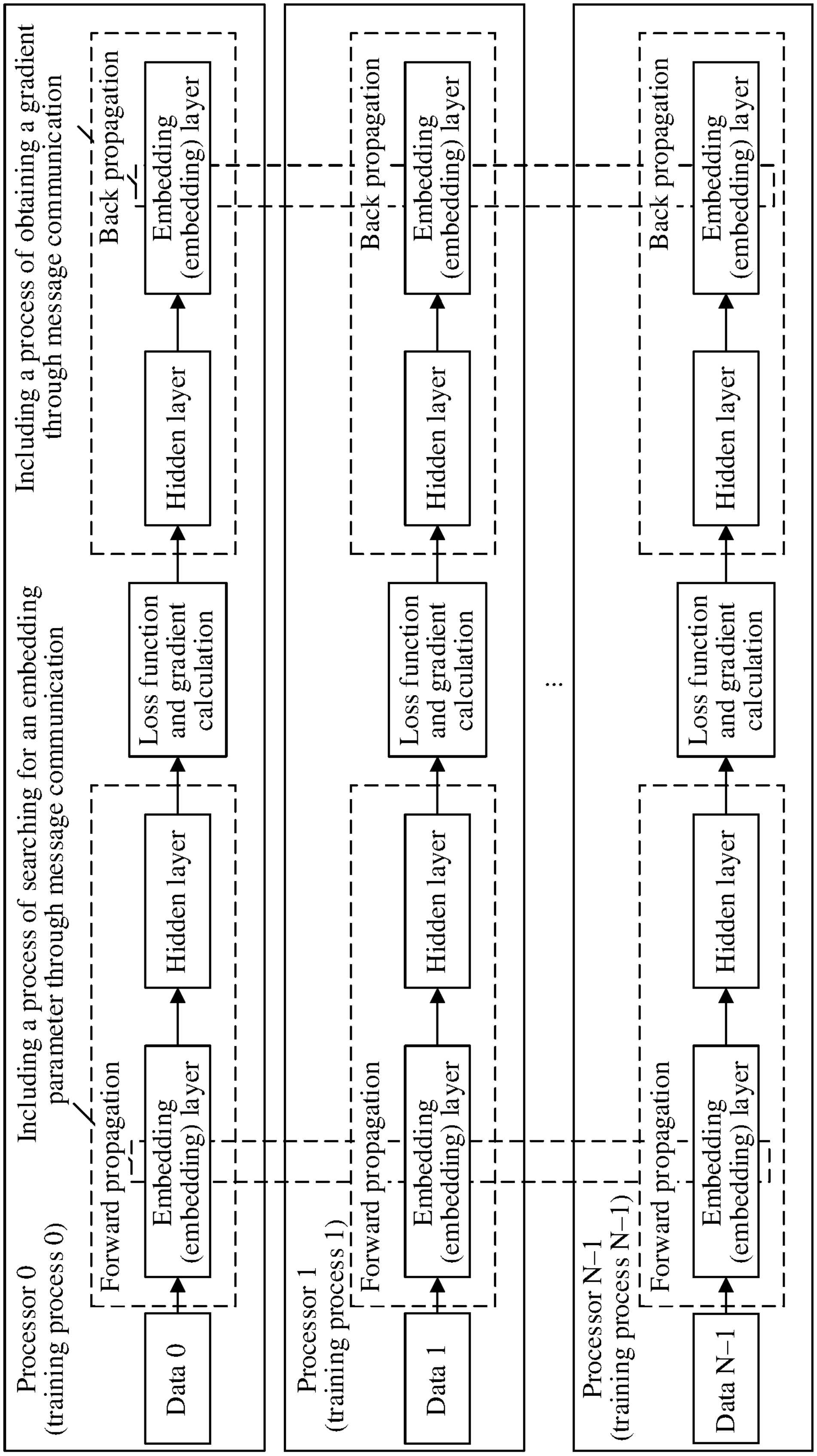
FIG. 5 is a schematic diagram of a data training model.

For example, for ease of understanding of the data parallel plus model parallel training manner, refer to FIG. 5.

It can be learned from FIG. 5 that, because a large amount of data needs to be trained, the data is divided into N pieces, and each of the N processors trains one piece of data. Each piece of data in the N pieces of data may be referred to as batch data (batch), each batch includes q pieces of sample data, and each piece of sample data includes a plurality of pieces of data. q is an integer greater than 0, q is referred to as a batch size, and quantities of data included in all pieces of sample data may be different.

In a training process, each processor runs one training process to train corresponding data, and each training process has a rank, so that the processor distinguishes between different processes. Message communication between processors described below may also be referred to as message communication between training processes.

Data training is performed by using a deep learning neural network. Therefore, a model used by each processor to train data includes but is not limited to submodels such as an input layer, an embedding layer, a hidden layer, a loss function operator, a gradient calculation operator, and a parameter update operator. For example, only some submodels are drawn for the model for training the data shown in FIG. 5.

The entire training process includes a forward propagation (FP) process and a back propagation (BP) process. It should be noted that, as shown in FIG. 5, an embedding layer in forward propagation and an embedding layer in back propagation are a same embedding layer, and similarly, a hidden layer in forward propagation and a hidden layer in back propagation are a same hidden layer. Separate drawing is to better distinguish between and reflect the forward propagation process and the back propagation process.

The forward propagation process includes: A processor inputs data to the embedding layer for mapping the data to a dense embedding parameter for calculation. During the calculation at the embedding layer, N processors need to perform message communication to search for embedding parameters of data trained by the N processors (the following describes in detail why and how to perform communication, and details are not described herein), where an output at the embedding layer is the embedding parameters of the data. The processor inputs these embedding parameters to the hidden layer for calculation, and outputs a predicted value, where the output predicted value may establish a loss function with a label; and calculates a gradient in a manner of automatic derivation.

The back propagation process includes: The processor derives gradients of all training parameters at the hidden layer and the embedding layer based on the loss function and the gradient in a backward chain derivation process, and then optimizes the parameters by using an optimization algorithm. Specifically, when the gradients are back propagated to the embedding layer, the processor obtains, based on the gradients through calculation, a gradient corresponding to an embedding parameter of each data. Then, the N processors obtain, through message communication, a gradient corresponding to an embedding parameter required by each processor, and the processor optimizes a corresponding embedding parameter based on the obtained gradient (the following describes in detail why and how to perform communication, and details are not described herein).

The following describes why during the calculation at the embedding layer, the N processors need to perform message communication to search for the embedding parameters of the data trained by the N processors, and describes how the N processors obtain the gradients through message communication.

In a specific embodiment, a function of the embedding layer is mainly to map data into a dense vector, where the dense vector is the foregoing embedding parameter. Because a large amount of data needs to be trained, and a model parallel manner is used for training, to facilitate calculation and save preprocessing computing resources, the data that needs to be trained may be randomly allocated to the N processors for training. Each of the N processors (or a training process of each processor) maintains one embedding table, where the embedding table is used to store data and an embedding parameter, and there is a one-to-one mapping relationship between data and an embedding parameter in the embedding table. An embedding parameter of the data randomly allocated to one processor may not necessarily be in the embedding table of the processor. Therefore, an embedding parameter of corresponding data needs to be obtained from an embedding table of another processor, and therefore, the embedding parameters of the data need to be queried from each other through message communication.

In a possible implementation, in this application, different embedding tables may be segmented through a modulo (mod) operation. Specifically, Remainders obtained by performing a modulo operation of data in a same embedding table mod N are the same. Optionally, a remainder obtained by performing a modulo operation of data in an embedding table of a processor i in the N processors mod N is i, and a process ID of training data in the processor i is i.

In another possible implementation, in this application, different embedding tables may be segmented through "division" calculation. Specifically, results obtained by dividing data in a same embedding table by N and rounding down are the same. For example, assuming that N is 3, and 4 and 5 belong to the data in the same embedding table, a result obtained by dividing 4 by 3 and rounding down is equal to 1, and a result obtained by dividing 5 by 3 and rounding down is equal to 1.

In another possible implementation, in this application, different embedding tables may be segmented through random allocation. Specifically, data in an embedding table of each of the N processors is random. During search, the data may be directly used as an index to search the embedding table for a corresponding embedding parameter.

It should be noted that, a manner of segmenting the embedding table is not limited in this embodiment of this application. The following describes a specific implementation process mainly by using an example in which an embedding table obtained through segmentation and a modulo operation. However, this does not constitute a limitation on this embodiment of this application.

In addition, in a specific implementation process, data and an embedding parameter in the embedding table of each of the N processors may be used as initialization data in the embedding table in current training by loading trained data in the embedding table of the model. Alternatively, when the embedding table is searched for data queried the first time, an embedding parameter of the data may be directly initialized by using a random number, and the data and a randomly generated embedding parameter are inserted into the embedding table to complete initialization. A manner of initializing the data in the embedding table is not limited in this application. For ease of understanding of the embedding table, refer to Table 1.

TABLE 1

| id | Embedding parameter |
|---|---|
| Data 1 | Parameter 1 |
| Data 2 | Parameter 2 |
| . . . | . . . |
| Data m | Parameter m |

Table 1 shows an example of content included in the embedding table and a structure. An id in Table 1 is data. In the embedding table, one embedding parameter is mapped to each piece of data. m in Table 1 may be any integer greater than 1.

Similarly, in a back propagation process, after obtaining, through calculation, gradients of embedding parameters corresponding to data trained by a processor, the processor needs to distribute the gradients corresponding to the embedding parameters of the data to a processor corresponding to an embedding table in which the data is located, so that the processor optimizes the embedding parameters in the embedding table of the processor. For ease of understanding, refer to Table 2.

TABLE 2

| Processor (training process) number | To-be-trained data | Remainder obtained by performing a modulo operation of the data mod 3 |
|---|---|---|
| Processor 0 (training process 0) | 10, 21, 14, and 19 | 1, 0, 2, and 1 |
| Processor 1 (training process 1) | 31, 23, 3, and 8 | 1, 2, 0, and 2 |
| Processor 2 (training process 2) | 12, 5, 19, and 33 | 0, 2, 1, and 0 |

In Table 2, it is assumed that N is 3, that is, three processors train data. Table 2 shows examples of to-be-trained data randomly allocated to each processor, and shows remainders obtained by performing a modulo operation of the data mod 3. The processor 0 is used as an example. Data that needs to be trained and that is randomly obtained by the processor 0 is 10, 21, 14, and 19, and corresponding remainders obtained by performing a modulo operation of the data mod 3 are respectively 1, 0, 2, and 1.

It is assumed that a remainder obtained by performing a modulo operation of data in an embedding table of a processor i in the N processors mod N is i, that is, a remainder obtained by performing a modulo operation of data in an embedding table of a 0th processor mod 3 is 0, a remainder obtained by performing a modulo operation of data in an embedding table of a 1st processor mod 3 is 1, and a remainder obtained by performing a modulo operation of data in an embedding table of a 2 nd processor mod 3 is 2. In this case, the processor 0 is used as an example. In the embedding table of the processor 0, there is only an embedding parameter to which data whose remainder is 0 after a modulo operation on 3 is mapped, and there is no embedding parameter to which data whose remainders are 1 and 2 after a modulo operation on 3 is mapped. Therefore, in the forward propagation process, the processor 0 needs to perform message communication with the processor 1 and the processor 2 to obtain embedding parameters of the data 10, 14, and 19.

Similarly, in the back propagation process, the processor 0 calculates gradients corresponding to the data 10, 21, 14, and 19, where the gradients are embedding parameters used to correct and update the data 10, 21, 14, and 19 in the embedding table. The embedding parameters of the data 10 and 19 are in the processor 1, and the embedding parameter of the data 14 is in the processor 2. Therefore, the processor 0 needs to send the calculated gradients of the data 10 and 19 to the processor 1, and send the calculated gradient of the data 14 to the processor 2. Communication of the gradient may be implemented through message communication.

It can be learned from the foregoing descriptions that in a data embedding process, regardless of whether forward propagation or back propagation is performed, the N processors that train data in a data parallel plus model parallel manner need to perform message communication, to search for an embedding parameter and a gradient of the data. However, in a solution in a conventional technology, when N processors communicate with each other, a many-to-many message communication manner is used. As a result, a communication bottleneck is generated, a communication latency is increased, and communication efficiency is reduced. In addition, a message communication process and a calculation process cannot be superimposed and optimized. Therefore, training efficiency of an entire training system is affected, and training performance is reduced. For ease of understanding of the foregoing many-to-many message communication manner, refer to FIG. 6.

Figure 6:
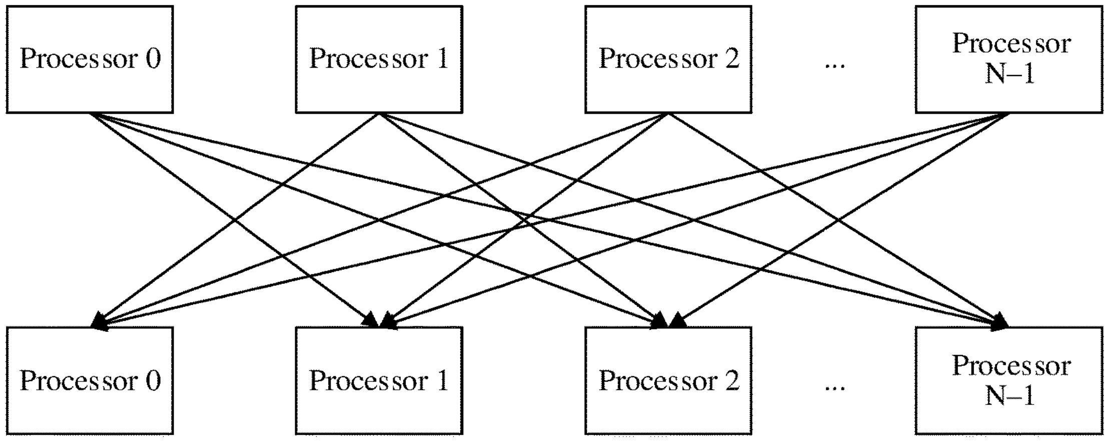
FIG. 6 is a schematic diagram of message communication in a solution in a conventional technology.

It can be learned from FIG. 6 that N processors send messages to each other, and each of the N processors sends a message to a plurality of other processors. In this case, both a bandwidth resource for sending and a bandwidth resource for receiving need to be consumed, and the processors need to queue to send messages and queue to receive messages, which easily causes a communication bottleneck and increases a communication latency.

Figure 7:
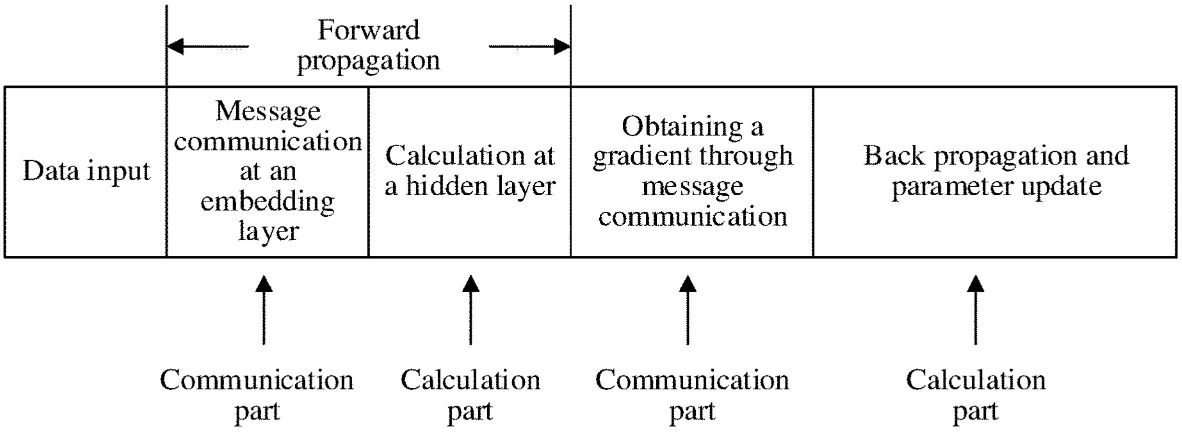
FIG. 7 is a schematic diagram of a communication part and a calculation part in a data training process.

For ease of understanding of the case in which the message communication process and the calculation process cannot be superimposed and optimized, refer to FIG. 7. It can be learned from FIG. 7 that a communication process and a calculation process cannot be superimposed, and a processor may perform a next calculation process only after the communication process is completed. Therefore, if the communication process has a high latency, efficiency of an entire training process is severely affected, and performance of a training system is further reduced.

To resolve the foregoing problem, this application provides a data processing method, to improve utilization of communication bandwidth between processors, and reduce communication latencies in forward propagation and back propagation at an embedding layer, to improve training efficiency.

Figure 8:
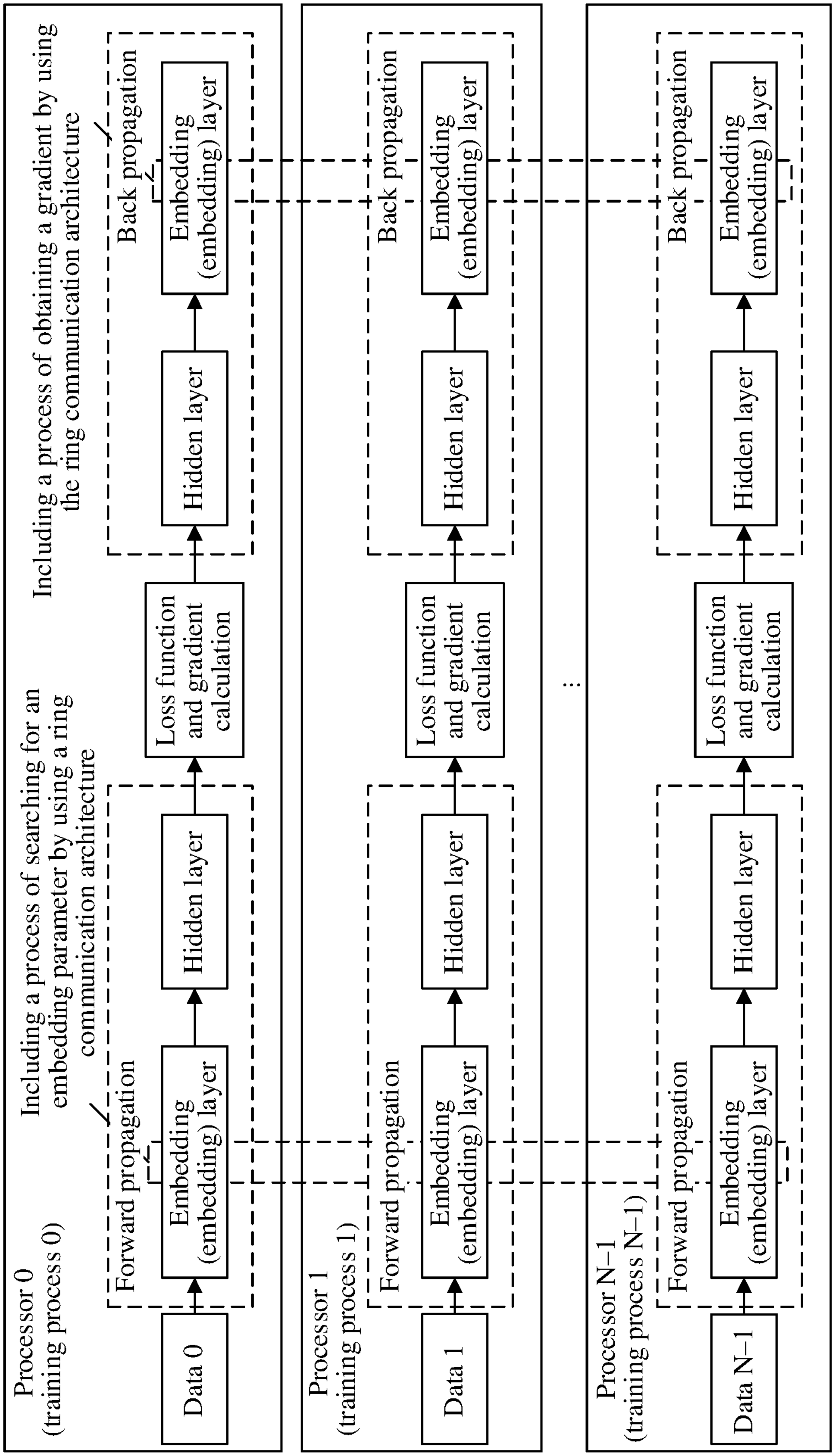
FIG. 8 is a schematic diagram of performing ring communication in a data training model according to this application.

According to the data processing method provided in this application, a ring communication architecture is mainly deployed between the N processors, so that in the forward propagation process at the embedding layer for data training, the processor communicates with another processor by using the ring communication architecture to search for an embedding parameter of corresponding data; and in the back propagation process at the embedding layer for data training, the processor communicates with another processor by using the ring communication architecture, to obtain a gradient that corresponds to an embedding parameter of data and that is required by the processor. FIG. 8 shows an example of a case in which in a data training process, after data reaches an embedding layer, N processors may search, by using a ring communication architecture, for embedding parameters required by the processors, and in a back propagation process, after the N processors back-propagate gradients to the embedding layer and obtain, through calculation, gradients corresponding to embedding parameters of the data, the N processors may perform message communication by using the ring communication architecture to obtain gradients required by the N processors.

In a specific embodiment, in a process of searching for an embedding parameter in a forward propagation process at the embedding layer, each of the N processors may generate a search message, and then the N processors each send the generated search message to a next-hop processor of each of the N processors in a communication manner of the ring communication architecture. After receiving the search message, each processor may identify whether data in the search message belongs to data in an embedding table maintained by the processor. If the data in the search message belongs to the data in the embedding table, each processor searches for an embedding parameter corresponding to the data that belongs to the data in the embedding table, and adds a found embedding parameter to the received message. Then, the processor sends again the message to which the embedding parameter is added to the next-hop processor of the processor in a communication manner of the ring communication architecture. If no data in the received message belongs to the data in the embedding table maintained by the processor, the processor directly sends the received message to the next-hop processor in a communication manner of the ring communication architecture. After the searching and sending operations are repeated for at least N times, each processor may obtain embedding parameters of all data that are searched for by the processor.

Similarly, in a process of obtaining a gradient in the back propagation process at the embedding layer, each of the N processors may generate a message including data and a corresponding gradient, and then the N processors each send the generated message to a next-hop processor of each of the N processors in a communication manner of the ring communication architecture. After receiving the message, each processor may identify whether data in the message belongs to data in an embedding table maintained by each processor. If the data in the message belongs to the data in the embedding table, the processor obtains a gradient corresponding to the data that belongs to the data in the embedding table in the message, to optimize and update a corresponding embedding parameter in the embedding table. Then, the processor sends the received message to the next-hop processor in a communication manner of the ring communication architecture. If no data in the received message belongs to the data in the embedding table maintained by the processor, the processor also sends the received message to the next-hop processor in a communication manner of the ring communication architecture. After the sending and obtaining operations are repeated for at least N−1 times, each processor may obtain gradients corresponding to embedding parameters of all data in the embedding table of the processor, so that optimization and update of the embedding parameters of all the data can be completed.

In a possible implementation, because the data trained in the data training system may be sparse data or dense data, if data that needs to be trained and that is received by the processor is sparse data, before searching for embedding parameters of the sparse data in the forward propagation process at the embedding layer, the processor may first convert the sparse data into dense data, and then use the dense data obtained through conversion as an index to search for corresponding embedding parameters. In this case, regardless of whether the data that needs to be trained by the processor is the sparse data or the dense data, in a process of searching for the embedding parameters of the sparse data in the forward propagation process at the embedding layer, data included in messages sent and received based on the ring communication architecture is dense data. In addition, in this case, the data in the embedding table maintained by the processor is also dense data.

Optionally, a process in which the N processors implement ring message communication by using the ring communication architecture may be encapsulated into a communication interface, that is, an operation of sending a message by each processor to a next-hop processor may be encapsulated into a sending interface, and an operation of receiving a message by each processor from a previous-hop processor may be encapsulated into a receiving interface. In this way, the processor needs to invoke the encapsulated sending interface when sending a message based on the ring communication architecture to send the message, and the processor needs to invoke the encapsulated receiving interface when receiving a message based on the ring communication architecture to receive the message.

Optionally, in this application, the process of searching for the embedding parameter in the forward propagation process at the embedding layer and the process of obtaining the gradient in the back propagation process at the embedding layer may be designed to be encapsulated into an invocable interface, and exposed to an artificial intelligence (AI) framework for use. That is, after receiving the search message of the embedding parameter, the processor may directly invoke the encapsulated interface to search for the embedding parameter, and then return a search result.

The search result may be a found embedding parameter of the data. Alternatively, if no corresponding embedding parameter is found, the returned result may be a null value.

Similarly, after receiving the message of the gradient, the processor may directly invoke the encapsulated interface to search for the gradient, and return an operation result. Because the processor searches the message for the gradient corresponding to the embedding parameter of the data that belongs to the embedding table of the processor, regardless of whether the gradient is found, the operation result returned by the processor may be a null value.

It should be noted that, a manner of encapsulating each operation in the foregoing data processing method provided in this application into an interface is not limited to the foregoing example implementation. In a specific embodiment, the plurality of operations may be randomly split and encapsulated into a plurality of interfaces for use by the AI framework. This is not limited in this application.

The foregoing comprehensively describes an overall process of the data processing method provided in this application. The following describes implementations of specific steps with reference to a figure.

Figure 9:
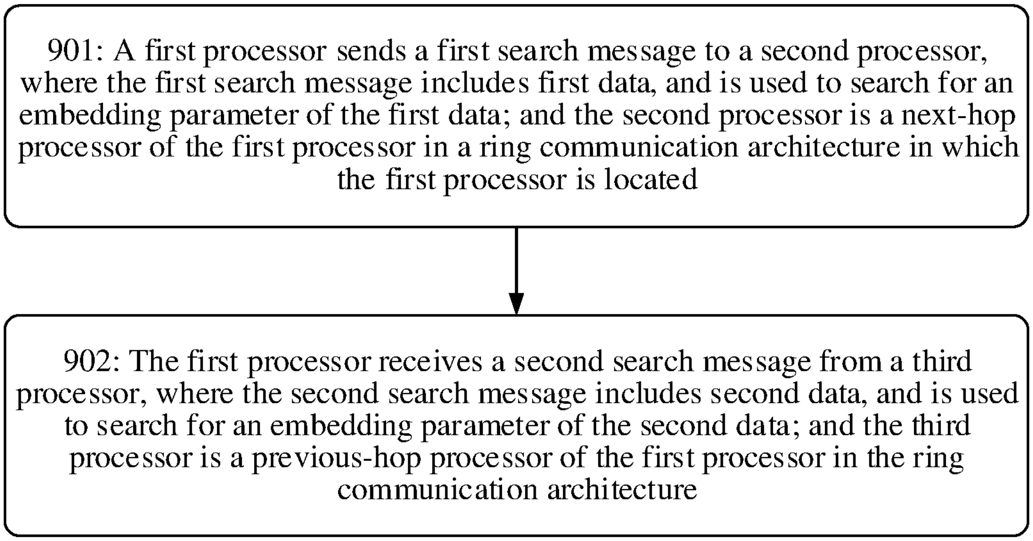
FIG. 9 is a schematic flowchart of a data processing method according to this application.

A data processing method provided in this application in a forward propagation process at an embedding layer is first described. Refer to FIG. 9. The data processing method may include but is not limited to the following steps.

901: A first processor sends a first search message to a second processor, where the first search message includes first data, and is used to search for an embedding parameter of the first data; and the second processor is a next-hop processor of the first processor in a ring communication architecture in which the first processor is located.

In a specific embodiment, the first processor may be any one of the N processors in the system shown in FIG. 4. Assuming that the first processor is a processor i (except i=N−1) in the N processors, the second processor is a processor i+1 in the N processors. If the first processor is a processor N−1, the second processor is a processor 0.

Specifically, it can be learned from the foregoing descriptions that, in the forward propagation process at the embedding layer, the N processors need to obtain, through message communication, embedding parameters of data that are required by the N processors. In this application, the N processors may implement message communication by using the ring communication architecture. In this embodiment, communication between the first processor, the next-hop processor (the second processor) of the first processor, and a previous-hop processor (a third processor in step 902) of the first processor is first used as an example to describe a process of searching for embedding parameters by using the ring communication architecture.

The first data may include one or more pieces of data. The first data may be sparse data or dense data. For example, for content included in the first search message, refer to Table 3.

TABLE 3

| id | Data 1 | Data 2 | . . . | Data k1 |
|---|---|---|---|---|
| Value range (value) | — | — | — | — |

Table 3 shows an example of some content included in the first search message. In Table 3, an id is data, and a value range is filled with an embedding parameter corresponding to the data. k1 in Table 3 may be any integer greater than 0. It is assumed that the first search message is an original message generated by the first processor, and a value range corresponding to data in the message may be a null value or a default original value (for example, the original value may be 0). This is not limited in this application. The first search message includes the first data, so that the processor that receives the message can find, based on the first data, the embedding parameter corresponding to the first data, to fill in a value range corresponding to the first data in the message.

In a possible implementation, assuming that a remainder obtained by performing a modulo operation of data in an embedding table of a processor i mod N in the N processors is i, the first search message may further include the remainder obtained by performing the modulo operation of the data mod N. Because the remainder is the same as a rank of the processor (a rank of a training process) in which the embedding table in which the data is located is located, it may also be considered that the first search message may further include the rank of the process in which the embedding table in which the data is located is located. For example, for details, refer to Table 4.

TABLE 4

| id | Data 1 | Data 2 | . . . | Data k1 |
|---|---|---|---|---|
| Process ID (Rank) | — | — | . . . | — |
| Value range | — | — | . . . | — |

The first search message includes the process ID, so that after receiving the message, the processor can quickly determine, by using the process ID, data that belongs to data in the embedding table maintained by the processor, to quickly find a corresponding embedding parameter to fill in a value range in the message, thereby improving search efficiency.

Alternatively, in another possible implementation, regardless of whether a remainder obtained by performing a modulo operation of data in the embedding table of the processor i in the N processors mod N is i, provided that the first processor can determine a rank of a training process in which the embedding parameter of the data is located, a format of the content included in the first search message may be the format shown in Table 4.

902: The first processor receives a second search message from a third processor, where the second search message includes second data, and is used to search for an embedding parameter of the second data; and the third processor is a previous-hop processor of the first processor in the ring communication architecture.

In a specific embodiment, assuming that the first processor is a processor i (except i=0) in the N processors, the third processor is a processor i−1 in the N processors. If the first processor is a processor 0, the third processor is the processor N−1.

The second data may include one or more pieces of data, and the second data is usually different from the first data. The second data may be sparse data or dense data. In a possible implementation, some data in the second data may be the same as some data in the first data. A format of the second search message is similar to the format of the first search message. For example, for a format of content included in the second search message, refer to descriptions corresponding to Table 3 or Table 4. Details are not described herein again.

Specifically, the N processors perform message communication by using the ring communication architecture, so that after the first processor sends the first search message to the next-hop processor of the first processor, that is, the second processor, and receives the second search message from the previous-hop processor of the first processor, that is, the third processor, the first processor performs, in response to the second search message, an operation of searching for the embedding parameter. Descriptions are provided below in two cases:

In Case 1, when embedding parameters of some or all data in the second data are found based on the second search message, the first processor adds the embedding parameters of the some or all data to the second search message, to obtain a third search message, and sends the third search message to the second processor, where the third search message is used to search for an embedding parameter of data whose embedding parameter is not found in the second data.

In a specific embodiment, assuming that a format of the content carried in the second search message is shown in Table 3, that is, no process ID is carried, after receiving the second search message, the first processor parses the message to obtain the second data in the message, and compares the second data with data in the embedding table maintained by the first processor. If the some or all data in the second data exists in the embedding table, the first processor obtains, from the embedding table, embedding parameters to which the some or all data is mapped. Then, the first processor adds, to value ranges corresponding to the some or all data in the second search message, the embedding parameters to which the some or all data is mapped, to obtain the third search message. Then, the first processor sends the third search message to the next-hop processor, that is, sends the third search message to the second processor.

Optionally, adding the embedding parameters to the value ranges in the message may be adding the embedding parameters to the value ranges in the message by performing an operation such as accumulation.

In a possible implementation, assuming that a remainder obtained by performing a modulo operation of data in the embedding table of the processor i in the N processors mod N is i, and a format of the content carried in the second search message is shown in Table 3, that is, no process ID is carried, after receiving the second search message, the first processor parses the message to obtain the second data in the message. Then, the first processor performs a modulo operation of each piece of data in the second data mod N, to obtain a remainder obtained by performing a modulo operation on each piece of data.

If one or more of remainders obtained through calculation are the same as a rank of a training process run by the first processor, data corresponding to the one or more remainders is stored in the embedding table maintained by the first processor. The first processor uses the data corresponding to the one or more remainders as an index to find, in the embedding table, an embedding parameter of the data corresponding to the one or more remainders, and correspondingly adds the found embedding parameter to a value range corresponding to the data corresponding to the one or more remainders in the second search message, to obtain a third search message. Then, the first processor sends the third search message to the next-hop processor, that is, sends the third search message to the second processor.

Alternatively, if one or more of remainders obtained through calculation are the same as a rank of a training process run by the first processor, the first processor uses data corresponding to the one or more remainders as an index, to search the embedding table maintained by the first processor for an embedding parameter of the data corresponding to the one or more remainders. If the data corresponding to the one or more remainders includes data that is not in the embedding table, the processor may randomly generate a corresponding embedding parameter for the data that is not in the embedding table, and then add the embedding parameter found in the embedding table and the randomly generated embedding parameter to a corresponding value range in the second search message, to obtain the third search message. Then, the first processor sends the third search message to the next-hop processor, that is, sends the third search message to the second processor. In addition, the processor adds the data that is not in the embedding table and the randomly generated embedding parameter to the embedding table in a one-to-one correspondence manner.

In a possible implementation, assuming that a remainder obtained by performing a modulo operation of data in the embedding table of the processor i mod N in the N processors is i, and a format of the content carried in the second search message is shown in Table 4, that is, a process ID is carried, after receiving the second search message, the first processor parses the message to obtain the second data and the corresponding process ID in the message.

If one or more ranks in process IDs in the second search message are a rank of the training process run by the first processor, data corresponding to the one or more ranks is stored in the embedding table maintained by the first processor. The first processor uses the data corresponding to the one or more ranks as an index to find, in the embedding table, an embedding parameter of the data corresponding to the one or more ranks, and correspondingly adds the found embedding parameter to a value range corresponding to the data corresponding to the one or more ranks in the second search message, to obtain a third search message. Then, the first processor sends the third search message to the next-hop processor, that is, sends the third search message to the second processor.

Alternatively, if one or more ranks in process IDs in the second search message are a rank of a training process run by the first processor, the first processor uses data corresponding to the one or more ranks as an index, to search the embedding table maintained by the first processor for an embedding parameter of the data corresponding to the one or more ranks. If the data corresponding to the one or more ranks includes data that is not in the embedding table, the processor may randomly generate a corresponding embedding parameter for the data that is not in the embedding table, and then add the embedding parameter found in the embedding table and the randomly generated embedding parameter to a corresponding value range in the second search message, to obtain the third search message. Then, the first processor sends the third search message to the next-hop processor, that is, sends the third search message to the second processor. In addition, the processor adds the data that is not in the embedding table and the randomly generated embedding parameter to the embedding table in a one-to-one correspondence manner.

To facilitate understanding of how the processor adds the embedding parameter to the value range in the second search message, the following uses an example for description. For details, refer to Table 5.

TABLE 5

| id | 9 | 8 | 13 | 3 |
|---|---|---|---|---|
| Value range | — | — | — | — |

It is assumed that the data shown in Table 5 is the data carried in the second search message, and the value range is null by default. The first processor determines that the data 9 and 3 in Table 5 belong to data in the embedding table maintained by the first processor, and finds, in the embedding table, that embedding parameters of the data 9 and 3 are respectively a parameter a and a parameter b. Then, the first processor directly adds the parameter a and the parameter b to value ranges corresponding to the data 9 and 3 respectively. After the addition, for details, refer to Table 6.

TABLE 6

| id | 9 | 8 | 13 | 3 |
|---|---|---|---|---|
| Value range | Parameter a | — | — | Parameter b |

In this case, the obtained third search message includes the content shown in Table 6.

In Case 2, the first processor sends the second search message to the second processor when an embedding parameter of the second data is not found based on the second search message.

In a specific embodiment, regardless of a format that is the format of the content included in the second search message and that is described above, if the first processor determines that no data in the second data included in the second search message belongs to data in the embedding table maintained by the first processor, that is, if the first processor cannot find the embedding parameter of the second data in the embedding table maintained by the first processor, the first processor sends the second search message to the next-hop processor, that is, sends the second search message to the second processor.

It should be noted that, if a remainder obtained by performing a modulo operation of data in an embedding table of a processor i in the N processors mod N is i, data whose remainder obtained by performing a modulo operation on N is the same as a rank of a training process run by the first processor belongs to data in the embedding table maintained by the first processor, and data other than the data does not belong to the data in the embedding table maintained by the first processor.

In a possible implementation, after the first processor receives the second search message and completes a response operation on the second search message, the first processor further receives a fourth search message from the third processor, where the fourth search message includes third data and an embedding parameter to which a first part of data in the third data is mapped, and the fourth search message is used to search for an embedding parameter to which data other than the first part of data in the third data is mapped.

In a specific embodiment, before the fourth search message is sent to the first processor, the embedding parameter of the first part of data in the third data carried in the fourth search message has been found in another processor. Therefore, the fourth search message carries the embedding parameter of the first part of data. The first part of data is one or more pieces of data in the third data. The third data may be sparse data or dense data.

Similar to the operation of receiving the second search message by the first processor, the first processor performs, in response to the fourth search message, an operation of searching for the embedding parameter. Similarly, descriptions are provided in two cases:

In Case 1, when an embedding parameter of a second part of data in the third data is found based on the fourth search message, the first processor adds the embedding parameter of the second part of data to the fourth search message to obtain a fifth search message, and sends the fifth search message to the second processor, where the second part of data is one or more pieces of data in the third data, and the second part of data is different from the first part of data.

In a specific embodiment, a format of the content carried in the fourth search message is shown in Table 3, that is, no process ID is carried, after receiving the fourth search message, the first processor parses the message to obtain the third data in the message, and compares the third data with data in the embedding table maintained by the first processor. If the second part of data in the third data exists in the embedding table, the first processor obtains, from the embedding table, an embedding parameter to which the second part of data is mapped. Then, the first processor adds, to a value range corresponding to the second part of data in the fourth search message, the embedding parameter to which the second part of data is mapped, to obtain the fifth search message. Then, the first processor sends the fifth search message to the next-hop processor, that is, sends the fifth search message to the second processor, where the fifth search message is used to search for an embedding parameter of data whose embedding parameter is not found in the third data.

In a possible implementation, assuming that a remainder obtained by performing a modulo operation of data in an embedding table of a processor i in the N processors mod N is i, and a format of the content carried in the fourth search message is shown in Table 3, that is, no process ID is carried, after receiving the fourth search message, the first processor parses the message to obtain the third data in the message. Then, the first processor performs a modulo operation of each piece of data in the third data mod N, to obtain a remainder obtained by performing a modulo operation on each piece of data.

If one or more of remainders obtained through calculation are the same as a rank of a training process run by the first processor, data corresponding to the one or more remainders is stored in the embedding table maintained by the first processor. The data corresponding to the one or more remainders is the second part of data. The first processor uses the data corresponding to the one or more remainders as an index to find, in the embedding table, an embedding parameter of the data corresponding to the one or more remainders, and correspondingly adds the found embedding parameter to a value range corresponding to the data corresponding to the one or more remainders in the fourth search message, to obtain a fifth search message. Then, the first processor sends the fifth search message to the next-hop processor, that is, sends the fifth search message to the second processor.

Alternatively, if one or more of remainders obtained through calculation are the same as a rank of a training process run by the first processor, the first processor uses data corresponding to the one or more remainders as an index, to search the embedding table maintained by the first processor for an embedding parameter of the data corresponding to the one or more remainders. If the data corresponding to the one or more remainders includes data that is not in the embedding table, the processor may randomly generate a corresponding embedding parameter for the data that is not in the embedding table, and then add the embedding parameter found in the embedding table and the randomly generated embedding parameter to a corresponding value range in the fourth search message, to obtain the fifth search message. Then, the first processor sends the fifth search message to the next-hop processor, that is, sends the fifth search message to the second processor. In addition, the processor adds the data that is not in the embedding table and the randomly generated embedding parameter to the embedding table in a one-to-one correspondence manner.

In a possible implementation, assuming that a remainder obtained by performing a modulo operation of data in an embedding table of a processor i in the N processors mod N is i, and a format of the content carried in the fourth search message is shown in Table 4, that is, a process ID is carried, after receiving the fourth search message, the first processor parses the message to obtain the third data and the corresponding process ID in the message.

If one or more ranks in process IDs in the fourth search message are a rank of the training process run by the first processor, data corresponding to the one or more ranks is stored in the embedding table maintained by the first processor. The data corresponding to the one or more ranks is the second part of data. The first processor uses the data corresponding to the one or more ranks as an index to find, in the embedding table, an embedding parameter of the data corresponding to the one or more ranks, and correspondingly adds the found embedding parameter to a value range corresponding to the data corresponding to the one or more ranks in the fourth search message, to obtain a fifth search message. Then, the first processor sends the fifth search message to the next-hop processor, that is, sends the fifth search message to the second processor.

Alternatively, if one or more ranks in process IDs in the fourth search message are a rank of a training process run by the first processor, the first processor uses data corresponding to the one or more ranks as an index, to search the embedding table maintained by the first processor for an embedding parameter of the data corresponding to the one or more ranks. If the data corresponding to the one or more ranks includes data that is not in the embedding table, the processor may randomly generate a corresponding embedding parameter for the data that is not in the embedding table, and then add the embedding parameter found in the embedding table and the randomly generated embedding parameter to a corresponding value range in the fourth search message, to obtain the fifth search message. Then, the first processor sends the fifth search message to the next-hop processor, that is, sends the fifth search message to the second processor. In addition, the processor adds the data that is not in the embedding table and the randomly generated embedding parameter to the embedding table in a one-to-one correspondence manner.

To facilitate understanding of how the processor adds the embedding parameter to the value range in the fourth search message, the following uses an example for description. For details, refer to Table 7.

TABLE 7

| id | 11 | 10 | 5 | 15 |
|---|---|---|---|---|
| Value range | Parameter c | — | Parameter d | — |

Assuming that the data shown in Table 7 is the data carried in the fourth search message, it can be learned that embedding parameters of the data 11 and 15 have been found in another processor, and a value range corresponding to other data whose embedding parameter is not found is null by default. The first processor determines that the data 15 in Table 7 belongs to data in the embedding table maintained by the first processor, and finds, in the embedding table, that an embedding parameter of the data 15 is a parameter e, and then the first processor directly adds the parameter e to a value range corresponding to the data 15. After the addition, for details, refer to Table 8.

TABLE 8

| id | 11 | 10 | 5 | 15 |
|---|---|---|---|---|
| Value range | Parameter c | — | Parameter d | Parameter e |

In this case, the obtained fifth search message includes the content shown in Table 8.

In Case 2, the first processor sends the fourth search message to the second processor when an embedding parameter of the third data is not found based on the fourth search message.

In a specific embodiment, regardless of a format that is the format of the content included in the fourth search message and that is described above, if the first processor determines that no data in the third data included in the fourth search message belongs to data in the embedding table maintained by the first processor, that is, if the first processor cannot find the embedding parameter of the third data in the embedding table maintained by the first processor, the first processor may send the fourth search message to the next-hop processor, that is, send the fourth search message to the second processor.

In a possible implementation, the fourth search message received by the first processor from the third processor includes embedding parameters to which all data in the third data is mapped instead of embedding parameters to which some data in the third data is mapped. In this case, if the first processor may determine that no data in the third data included in the fourth search message belongs to the data in the embedding table maintained by the first processor, the first processing may send the fourth search message to the next-hop processor, that is, send the fourth search message to the second processor.

In a possible implementation, after the operation of sending the message and the operation of searching for the embedding parameter are repeated for N−1 times, the first processor may receive a sixth search message from the third processor in an $N^{th}$ cycle, where the sixth search message includes the first data and the embedding parameter of the first data. That is, the sixth search message is a message generated by the first processor, and the first data carried in the message is data that needs to be trained by the first processor. After N cycles, the message carrying the first data passes through the N processors, and the embedding parameter of the first data is found in one or more of the N processors. As the message is continuously forwarded, the found embedding parameter is finally sent to the first processor by using the sixth search message, so that the first processor obtains all embedding parameters of data trained by the first processor. For example, refer to Table 9.

TABLE 9

| id | 16 | 20 | 19 | 27 |
|---|---|---|---|---|
| Value range | Parameter f | Parameter g | Parameter h | Parameter r |

Table 9 shows an example of the first data and the embedding parameter of the first data that are included in the sixth search message. It can be learned that the embedding parameter of the first data has been found and is filled in a value range corresponding to each piece of data.

After the first processor obtains, by using the sixth search message, all embedding parameters of training data of the first processor, if the training data is sparse data, the first processor needs to perform a reduce operation on the obtained embedding parameters of the training data, and then continues to forward-propagate, to a hidden layer, embedding parameters obtained through the reduce operation. For example, the reduce operation may be performing weighted summation or the like on embedding parameters of training data of a same type or with high correlation. For a specific reduce operation, refer to an operation in an existing solution. This is not limited in this application.

For ease of understanding of the foregoing data processing method provided in this application in the forward propagation process at the embedding layer, the following uses an example for description. For details, refer to FIG. 10A to FIG. 10E. In FIG. 10A to FIG. 10E, it is assumed that the N processors are four processors: a processor 0, a processor 1, a processor 2, and a processor 3. The four processors implement message communication by using the ring communication architecture. In this example, an example in which a remainder obtained by performing a modulo operation of data in an embedding table of a processor i in the N processors mod N is i is used for description.

Figure 10A:
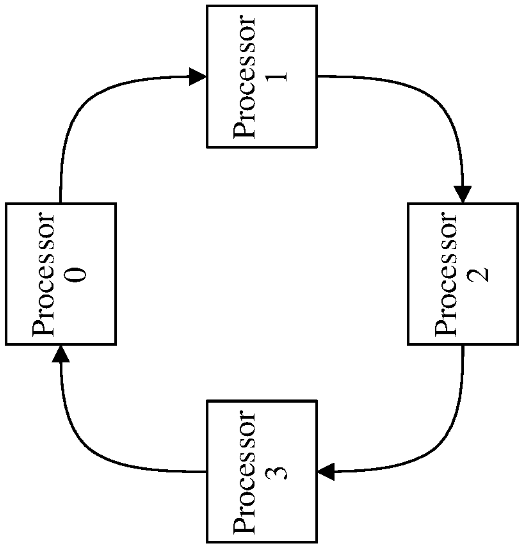
FIG. 10A to FIG. 10E each are a schematic flowchart of ring communication according to this application.

First, refer to FIG. 10A. In a forward propagation process at an embedding layer, each processor needs to first find an embedding parameter of data trained by the processor. In FIG. 10A, it is assumed that data whose embedding parameters need to be searched for by a processor 0 is a first batch of data: 21, 5, 14, and 25, and remainders obtained by performing a modulo operation of the first batch of data mod 4 are respectively 1, 1, 2, and 1, that is, embedding parameters of the data 21, 5, and 25 need to be searched for in a processor 1, and an embedding parameter of the data 14 needs to be searched for in a processor 2. In FIG. 10A, it is assumed that data whose embedding parameters need to be searched for by the processor 1 is a second batch of data: 19, 2, 10, and 32, and remainders obtained by performing a modulo operation of the second batch of data mod 4 are respectively 3, 2, 2, and 0, that is, embedding parameters of the data 2 and 10 need to be searched for in the processor 2, an embedding parameter of the data 19 needs to be searched for in a processor 3, and an embedding parameter of the data 32 needs to be searched for in the processor 0. In FIG. 10A, it is assumed that data whose embedding parameters need to be searched for by the processor 2 is a third batch of data: 13, 8, 16, and 29, and remainders obtained by performing a modulo operation of the third batch of data mod 4 are respectively 1, 0, 0, and 1, that is, embedding parameters of the data 8 and 16 need to be searched for in the processor 0, and embedding parameters of the data 13 and 29 need to be searched for in the processor 1. In FIG. 10A, it is assumed that data whose embedding parameters need to be searched for by the processor 3 is a fourth batch of data: 6, 33, 18, and 4, and remainders obtained by performing a modulo operation of the fourth batch of data mod 4 are respectively 2, 1, 2, and 0, that is, embedding parameters of the data 6 and 18 need to be searched for in the processor 2, an embedding parameter of the data 33 needs to be searched for in the processor 1, and an embedding parameter of the data 4 needs to be searched for in the processor 0. The remainder obtained by performing the modulo operation of each piece of data mod 4 is a rank of a process in which an embedding parameter of each piece of data is located.

In FIG. 10A, each processor first generates a message, where the message includes data whose embedding parameter needs to be searched for by each processor, a corresponding process ID, and value range space filled with an embedding parameter. After generating a message, each processor sends a message generated by each processor to a next-hop processor in a communication manner of the ring communication architecture, and receives a message sent by a previous-hop processor. After receiving the message, the processor performs a corresponding table lookup operation. For a specific table lookup operation, refer to the foregoing description. Details are not described herein again. Then, the processor fills the found embedding parameter in the received message. For details, refer to FIG. 10B.

Figure 10B:
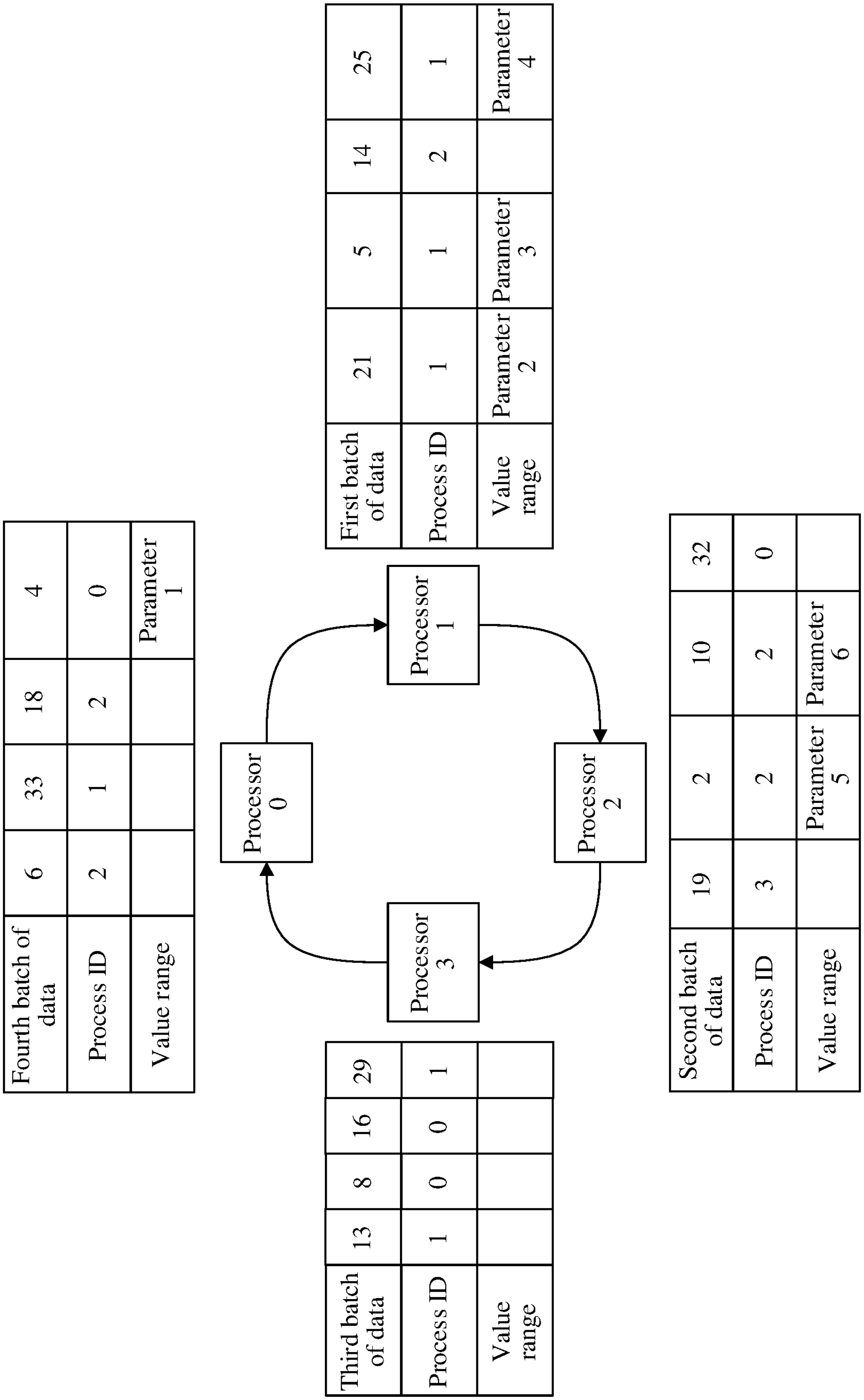

It can be learned from FIG. 10B that the processor 0 sends a message including the first batch of data to the processor 1, receives a message including the fourth batch of data from the processor 3, then finds the embedding parameter of the data 4 in an embedding table of the processor 0, and adds the embedding parameter to a value range corresponding to the data 4 in the received message to obtain a new message. The processor 1 sends a message including the second batch of data to the processor 2, receives the message including the first batch of data from the processor 0, then finds the embedding parameters of the data 21, 5 and 25 in an embedding table of the processor 1, and adds the embedding parameters to value ranges corresponding to the data 21, 5, and 25 in the received message to obtain a new message. The processor 2 sends a message including the third batch of data to the processor 3, receives the message including the second batch of data from the processor 1, then finds the embedding parameters of the data 2 and 10 in an embedding table of the processor 2, and adds the embedding parameters to value ranges corresponding to the data 2 and 10 in the received message to obtain a new message. The processor 3 sends the message including the fourth batch of data to the processor 0, and receives the message including the third batch of data from the processor 2. Because no data in the third batch of data belongs to data in an embedding table of the processor 3, no embedding parameter of any data in the third batch of data is found in the processor 3.

In FIG. 10B, a processor that obtains a new message sends the new message obtained by the processor to a next-hop processor, and a processor (the processor 3) that does not obtain a new message sends a received message to a next-hop processor. After sending the message, each processor receives a new message from a previous-hop processor of each processor, and then continues to search for an embedding parameter in response to the new message. Then, the processor fills the found embedding parameter in the received message. For details, refer to FIG. 10C.

Figure 10C:
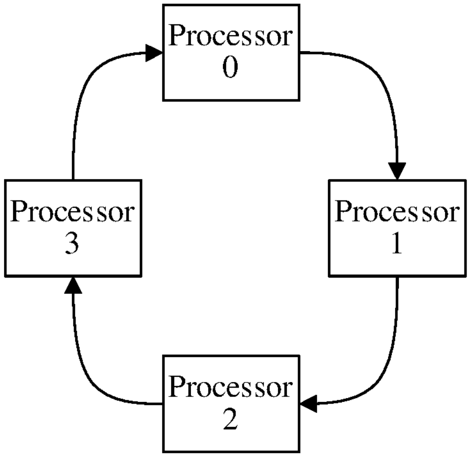

In FIG. 10C, the processor 0 sends a message including the fourth batch of data to the processor 1, receives a message including the third batch of data from the processor 3, then finds the embedding parameters of the data 8 and 16 in an embedding table of the processor 0, and adds the embedding parameters to value ranges corresponding to the data 8 and 16 in the received message to obtain a new message. The processor 1 sends a message including the first batch of data to the processor 2, receives the message including the fourth batch of data from the processor 0, then finds the embedding parameter of the data 33 in an embedding table of the processor 1, and adds the embedding parameter to a value range corresponding to the data 33 in the received message to obtain a new message. The processor 2 sends a message including the second batch of data to the processor 3, receives the message including the first batch of data from the processor 1, finds the embedding parameter of the data 14 in an embedding table of the processor 2, and adds the embedding parameter to a value range corresponding to the data 14 in the received message to obtain a new message. The processor 3 sends the message including the third batch of data to the processor 0, receives the message including the second batch of data from the processor 2, finds the embedding parameter of the data 19 in an embedding table of the processor 3, and adds the embedding parameter to a value range corresponding to the data 19 in the received message to obtain a new message.

In FIG. 10C, each processor sends a new message obtained by each processor to a next-hop processor. After sending the message, each processor receives a new message from a previous-hop processor of each processor, and then continues to search for an embedding parameter in response to the new message. Then, the processor fills the found embedding parameter in the received message. For details, refer to FIG. 10D.

Figure 10D:
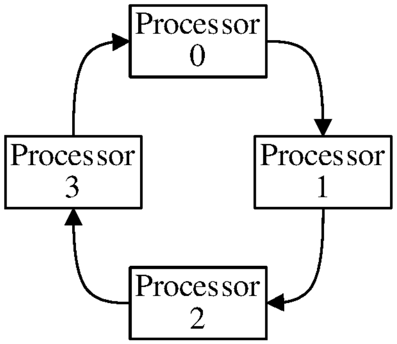

In FIG. 10D, the processor 0 sends a message including the third batch of data to the processor 1, receives a message including the second batch of data from the processor 3, finds the embedding parameter of the data 32 in an embedding table of the processor 3, and adds the embedding parameter to a value range corresponding to the data 32 in the received message to obtain a new message. The processor 1 sends a message including the fourth batch of data to the processor 2, receives the message including the third batch of data from the processor 0, then finds the embedding parameters of the data 13 and 29 in an embedding table of the processor 1, and adds the embedding parameters to value ranges corresponding to the data 13 and 29 in the received message to obtain a new message. The processor 2 sends a message including the first batch of data to the processor 3, receives the message including the fourth batch of data from the processor 1, then finds the embedding parameters of the data 6 and 18 in an embedding table of the processor 2, and adds the embedding parameters to value ranges corresponding to the data 6 and 18 in the received message to obtain a new message. The processor 3 sends the message including the second batch of data to the processor 0, and receives the message including the first batch of data from the processor 2. Because no data in the first batch of data belongs to data in an embedding table of the processor 3, no embedding parameter of any data in the first batch of data is found in the processor 3.

In FIG. 10D, a processor that obtains a new message sends the new message obtained by the processor to a next-hop processor, and a processor (the processor 3) that does not obtain a new message sends a received message to a next-hop processor. After sending the message, each processor receives a new message from a previous-hop processor of each processor. In this cycle, the message received by each processor includes data trained by the processor and an embedding parameter required by the processor, to complete the whole process of searching for the embedding parameter at the embedding layer. For details, refer to FIG. 10E.

Figure 10E:
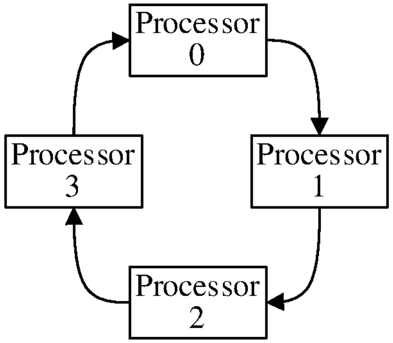

It can be learned from FIG. 10E that the processor 0 sends a message including the second batch of data to the processor 1, and receives a message including the first batch of data from the processor 3, where the message includes embedding parameters of the first batch of data that are required by the processor 0. The processor 1 sends a message including the third batch of data to the processor 2, and receives the message including the second batch of data from the processor 0, where the message includes embedding parameters of the second batch of data that are required by the processor 1. The processor 2 sends a message including the fourth batch of data to the processor 3, and receives the message including the third batch of data from the processor 1, where the message includes embedding parameters of the third batch of data that are required by the processor 2. The processor 3 sends the message including the first batch of data to the processor 0, and receives the message including the fourth batch of data from the processor 2, where the message includes embedding parameters of the fourth batch of data that are required by the processor 3.

It should be noted that, FIG. 10A to FIG. 10E and related descriptions thereof are merely examples, and do not constitute a limitation on this application. Variations made based on the foregoing ideas shall fall within the protection scope of this application.

In conclusion, in this example, the four processors find, through four cycles, embedding parameters required by the four processors. Because the processors implement communication by using the ring communication architecture, compared with a many-to-many message communication manner in a solution in a conventional technology, this manner in this application avoids a single-point communication bottleneck, reduces a communication latency, and improves communication efficiency, to improve training performance of the entire data training system.

The following describes a data processing method provided in this application in a back propagation process at an embedding layer. It should be noted that in the following embodiment of the data processing method provided in this application in the back propagation process at the embedding layer, the “first processor (or data)”, the “second processor (or data)”, the “third processor (or data)”, and the like that are used to distinguish between different objects and corresponding same names in FIG. 9 and the possible implementations of FIG. 9 may be a same object or different objects.

Figure 11:
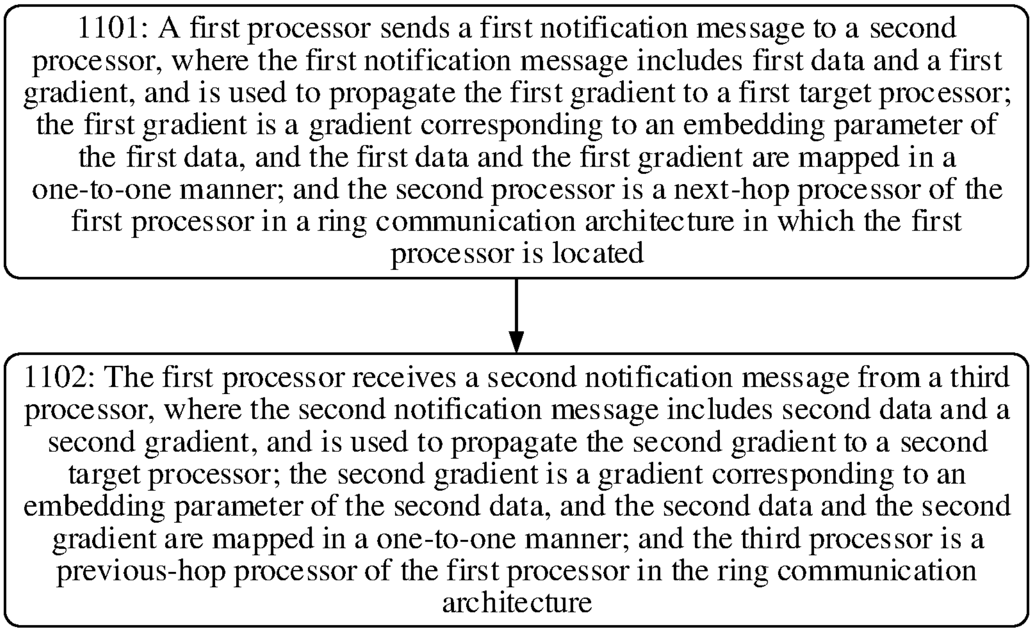
FIG. 11 is a schematic flowchart of another data processing method according to this application.

Refer to FIG. 11. In a back propagation process at an embedding layer, a data processing method provided in this application may include but is not limited to the following steps.

1101: A first processor sends a first notification message to a second processor, where the first notification message includes first data and a first gradient, and is used to propagate the first gradient to a first target processor; the first gradient is a gradient corresponding to an embedding parameter of the first data, and the first data and the first gradient are mapped in a one-to-one manner; and the second processor is a next-hop processor of the first processor in a ring communication architecture in which the first processor is located.

In a specific embodiment, the first processor may be any one of the N processors in the system shown in FIG. 4. Assuming that the first processor is a processor i (except i=N−1) in the N processors, the second processor is a processor i+1 in the N processors. If the first processor is a processor N−1, the second processor is a processor 0.

Specifically, in the back propagation process at the embedding layer, the N processors each obtain a gradient of an embedding parameter of data trained by each processor. However, because the embedding parameter of the data trained by each processor is stored in an embedding table of another processor, the gradient needs to be sent to a corresponding processor through message communication to optimize a corresponding embedding parameter. Similarly, in this application, the N processors implement message communication by using the ring communication architecture. In this embodiment, communication between the first processor, the next-hop processor (the second processor) of the first processor, and a previous-hop processor (a third processor in step 1102) of the first processor is first used as an example to describe a process of obtaining a gradient required by each of the processors by using the ring communication architecture.

The first target processor includes one or more of the N processors. A specific processor that is the first target processor is determined based on the first data in the first notification message. For example, assuming that the first data includes some or all data in an embedding table of a processor i, the first target processor includes the processor i.

The first data may include one or more pieces of data. For example, for content included in the first notification message, refer to Table 10.

TABLE 10

| id | Data 1 | Data 2 | . . . | Data k2 |
|---|---|---|---|---|
| Value range | Gradient 1 | Gradient 2 | . . . | Gradient k2 |

Table 10 shows an example of some content included in the first notification message. In Table 10, an id is data, and a value range is a gradient corresponding to an embedding parameter of the data. k2 in Table 10 may be any integer greater than 0.

In a possible implementation, assuming that a remainder obtained by performing a modulo operation of data in an embedding table of a processor i in the N processors mod N is i, the first notification message may further include the remainder obtained by performing the modulo operation of the data mod N. Because the remainder is the same as a rank of the processor (a rank of a training process) in which the embedding table in which the data is located is located, it may also be considered that the first notification message may further include the rank of the process in which the embedding table in which the data is located is located. For example, for details, refer to Table 11.

TABLE 11

| id | Data 1 | Data 2 | . . . Data k2 |
|---|---|---|---|
| Process ID (Rank) | Rank 1 | Rank 2 | . . . Rank 3 |
| Value range | Gradient 1 | Gradient 2 | . . . Gradient k2 |

The first notification message includes the process ID, so that after receiving the message, the processor can quickly determine, by using the process ID, data that belongs to data in the embedding table maintained by the processor, to quickly obtain a corresponding gradient.

Alternatively, in another possible implementation, regardless of whether a remainder obtained by performing a modulo operation of data in the embedding table of the processor i in the N processors mod N is i, provided that the first processor can determine a rank of a training process in which the embedding parameter of the data is located, a format of the content included in the first notification message may be the format shown in Table 11.

1102: The first processor receives a second notification message from a third processor, where the second notification message includes second data and a second gradient, and is used to propagate the second gradient to a second target processor; the second gradient is a gradient corresponding to an embedding parameter of the second data, and the second data and the second gradient are mapped in a one-to-one manner; and the third processor is a previous-hop processor of the first processor in the ring communication architecture.

In a specific embodiment, assuming that the first processor is a processor i (except i=0) in the N processors, the third processor is a processor i−1 in the N processors. If the first processor is a processor 0, the third processor is the processor N−1.

The second target processor includes one or more of the N processors. A specific processor that is the second target processor is determined based on the second data in the second notification message. For example, assuming that the second data includes some or all data in an embedding table of a processor i, the second target processor includes the processor i.

The second data may include one or more pieces of data, and the second data is usually different from the first data. In a possible implementation, some data in the second data may be the same as some data in the first data. A format of the second notification message is similar to the format of the first notification message. For example, for a format of content included in the second notification message, refer to descriptions corresponding to Table 10 or Table 11. Details are not described herein again.

Specifically, the N processors perform message communication by using the ring communication architecture, so that after the first processor sends the first notification message to the next-hop processor of the first processor, that is, the second processor, and receives the second notification message from the previous-hop processor of the first processor, that is, the third processor, the first processor performs, in response to the second notification message, an operation of obtaining the gradient. Descriptions are provided below in two cases:

In Case 1, when the second notification message includes a first target gradient, the first processor obtains the first target gradient from the second notification message, and sends the second notification message to the second processor, to continue to indicate another processor in the second target processor to obtain a required gradient, where the first target gradient is a gradient of an embedding parameter in a first embedding table maintained by the first processor, and there is a one-to-one mapping relationship between data and an embedding parameter in the first embedding table.

In a specific embodiment, assuming that a format of the content carried in the second notification message is shown in Table 10, that is, no process ID is carried, after receiving the second notification message, the first processor parses the message to obtain the second data in the message, and compares the second data with data in the embedding table maintained by the first processor. If some or all data in the second data exists in the embedding table, the first processor extracts, from a value range in the parsed second notification message, gradients corresponding to the some or all data, to optimize embedding parameters of the some or all data in the first embedding table maintained by the first processor. After extracting the gradients, the first processor re-encapsulates the second notification message, and sends the second notification message to the next-hop processor, that is, the second processor.

In a possible implementation, assuming that a remainder obtained by performing a modulo operation of data in an embedding table of a processor i in the N processors mod N is i, and a format of the content carried in the second notification message is shown in Table 10, that is, no process ID is carried, after receiving the second notification message, the first processor parses the message to obtain the second data in the message. Then, the first processor performs a modulo operation of each piece of data in the second data mod N, to obtain a remainder obtained by performing a modulo operation on each piece of data. If one or more of remainders obtained through calculation are the same as a rank of a training process run by the first processor, data corresponding to the one or more remainders is stored in the embedding table maintained by the first processor. The first processor extracts, from a value range in the parsed second notification message, gradients corresponding to the data corresponding to the one or more remainders, to optimize embedding parameters of the data corresponding to the one or more remainders in the first embedding table maintained by the first processor. After extracting the gradients, the first processor re-encapsulates the second notification message, and sends the second notification message to the next-hop processor, that is, the second processor.

In a possible implementation, assuming that a remainder obtained by performing a modulo operation of data in an embedding table of a processor i in the N processors mod N is i, and a format of the content carried in the second notification message is shown in Table 11, that is, a process ID is carried, after receiving the second notification message, the first processor parses the message to obtain the second data and the corresponding process ID in the message. If one or more ranks in process IDs in the second notification message are a rank of the training process run by the first processor, data corresponding to the one or more ranks is stored in the embedding table maintained by the first processor. The first processor extracts, from a value range in the parsed second notification message, gradients corresponding to the data corresponding to the one or more ranks, to optimize embedding parameters of the data corresponding to the one or more ranks in the first embedding table maintained by the first processor. After extracting the gradients, the first processor re-encapsulates the second notification message, and sends the second notification message to the next-hop processor, that is, the second processor.

In Case 2, the first processor sends the second notification message to the second processor when the second notification message does not include the first target gradient.

In a specific embodiment, regardless of whether the format of the content included in the second notification message is the format shown in Table 10 or Table 11, if the first processor determines that no data in the second data included in the second notification message belongs to data in the embedding table maintained by the first processor, the first processor does not need to extract a gradient from the second notification message, and sends the second notification message to the next-hop processor, that is, sends the second notification message to the second processor.

In a possible implementation, after the first processor receives the second notification message and completes a response operation on the second notification message, the first processor further receives a third notification message from the third processor.

The third notification message includes third data and a third gradient, and is used to propagate the third gradient to a third target processor; and the third gradient is a gradient corresponding to an embedding parameter of the third data, and the third data and the third gradient are mapped in a one-to-one manner.

The third target processor includes one or more of the N processors. A specific processor that is the third target processor is determined based on the third data in the third notification message. For example, assuming that the third data includes some or all data in an embedding table of a processor i, the third target processor includes the processor i.

The third data may include one or more pieces of data, and the third data is usually different from the first data and the second data. In a possible implementation, some data in the third data may be the same as some data in the first data or some data in the second data. A format of the third notification message is similar to the format of the first notification message. For example, for a format of content included in the third notification message, refer to descriptions corresponding to Table 10 or Table 11. Details are not described herein again.

Specifically, when the third notification message includes a second target gradient, the first processor obtains the second target gradient from the third notification message, and sends the third notification message to the second processor, to continue to indicate another processor in the third target processor to obtain a required gradient, where the second target gradient is a gradient of an embedding parameter in the first embedding table maintained by the first processor. Alternatively, when the third notification message does not include the second target gradient, the first processor sends the third notification message to the second processor, to continue to indicate another processor in the third target processor to obtain a required gradient. For specific implementation steps, refer to descriptions in Case 1 and Case 2 in step 1102. Details are not described herein again.

In a possible implementation, the N processors perform message communication by using the ring communication architecture. After the operation of sending the message and the operation of obtaining the gradient are repeated for at least N−1 times, each of the N processors obtains a gradient of an embedding parameter in an embedding table of each processor, so that each processor can correspondingly optimize the embedding parameter in the embedding table of each processor based on the obtained gradient.

For ease of understanding of the foregoing data processing method provided in this application in the back propagation process at the embedding layer, the following uses an example for description. For details, refer to FIG. 12A to FIG. 12D. In FIG. 12A to FIG. 12D, it is assumed that the N processors are four processors: a processor 0, a processor 1, a processor 2, and a processor 3. The four processors implement message communication by using the ring communication architecture. In this example, an example in which a remainder obtained by performing a modulo operation of data in an embedding table of a processor i in the N processors mod N is i is used for description.

Figure 12A:
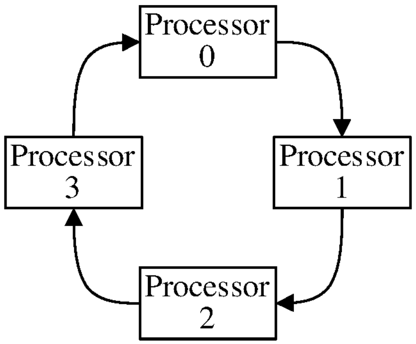
FIG. 12A to FIG. 12D each are a schematic flowchart of ring communication according to this application.

First, refer to FIG. 12A. In a back propagation process at an embedding layer, each processor needs to first obtain a gradient of an embedding parameter of data trained by the processor, to correspondingly optimize the embedding parameter in the embedding table based on the gradient of each embedding parameter. In FIG. 12A, for descriptions of a first batch of data, a second batch of data, a third batch of data, and a fourth batch of data, refer to the foregoing descriptions of FIG. 10A. Details are not described herein again. In FIG. 12A, each processor first generates a message, where the message includes data, a corresponding process ID, and a gradient corresponding to the data. After generating a message, each processor sends a message generated by each processor to a next-hop processor in a communication manner of the ring communication architecture, and receives a message sent by a previous-hop processor. For details, refer to FIG. 12B. After receiving the message, the processor may perform a corresponding operation of obtaining a gradient. For a specific obtaining operation, refer to the descriptions in step 1102. Details are not described herein again.

Figure 12B:
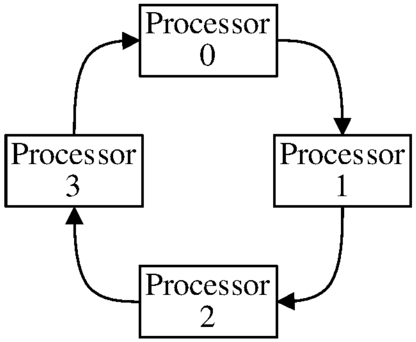

It can be learned from FIG. 12B that the processor 0 sends a message including the first batch of data to the processor 1, receives a message including the fourth batch of data from the processor 3, and then obtains a gradient 16 corresponding to data 4 in the received message. The processor 1 sends a message including the second batch of data to the processor 2, receives the message including the first batch of data from the processor 0, and then obtains a gradient 1, a gradient 2, and a gradient 4 that respectively correspond to data 21, 5, and 25 in the received message. The processor 2 sends a message including the third batch of data to the processor 3, receives the message including the second batch of data from the processor 1, and then obtains a gradient 6 and a gradient 7 that respectively correspond to data 2 and data 10 in the received message. The processor 3 sends the message including the fourth batch of data to the processor 0, and receives the message including the third batch of data from the processor 2. Because no data in the third batch of data belongs to data in an embedding table of the processor 3, the processor 3 does not obtain any gradient from the received message.

In FIG. 12B, after completing, in response to the received message, the operation of obtaining the gradient, each processor sends the received message to a next-hop processor. For details, refer to FIG. 12C.

Figure 12C:
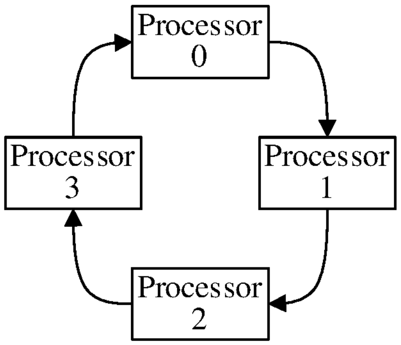

It can be learned from FIG. 12C that the processor 0 sends a message including the fourth batch of data to the processor 1, receives a message including the third batch of data from the processor 3, and then obtains a gradient 10 and a gradient 11 that respectively correspond to data 8 and data 16 in the received message. The processor 1 sends a message including the first batch of data to the processor 2, receives the message including the fourth batch of data from the processor 0, and then obtains a gradient 14 corresponding to data 33 in the received message. The processor 2 sends a message including the second batch of data to the processor 3, receives the message including the first batch of data from the processor 1, and then obtains a gradient 3 corresponding to data 14 in the received message. The processor 3 sends the message including the third batch of data to the processor 0, receives the message including the second batch of data from the processor 2, and then obtains a gradient 5 corresponding to the data 19 in the received message.

In FIG. 12C, after completing, in response to the received message, the operation of obtaining the gradient, each processor sends the received message to a next-hop processor. For details, refer to FIG. 12D.

Figure 12D:
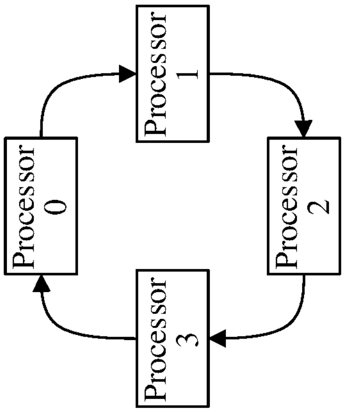

It can be learned from FIG. 12D that the processor 0 sends a message including the third batch of data to the processor 1, receives a message including the second batch of data from the processor 3, and then obtains a gradient 8 corresponding to data 32 in the received message. The processor 1 sends a message including the fourth batch of data to the processor 2, receives the message including the third batch of data from the processor 0, and then obtains a gradient 9 and a gradient 12 that respectively correspond to data 13 and 29 in the received message. The processor 2 sends a message including the first batch of data to the processor 3, receives the message including the fourth batch of data from the processor 1, and then obtains a gradient 13 and a gradient 15 that respectively correspond to data 6 and 18 in the received message. The processor 3 sends the message including the second batch of data to the processor 0, and receives the message including the first batch of data from the processor 2. Because no data in the first batch of data belongs to data in an embedding table of the processor 3, the processor 3 does not obtain any gradient from the received message.

It should be noted that, FIG. 12A to FIG. 12D and related descriptions thereof are merely examples, and do not constitute a limitation on this application. Variations made based on the foregoing ideas shall fall within the protection scope of this application.

In conclusion, in this example, the four processors obtain, through three cycles in FIG. 12B to FIG. 12D, gradients required by the four processors. Because the processors implement communication by using the ring communication architecture, compared with a many-to-many message communication manner in a solution in a conventional technology, this manner in this application avoids a single-point communication bottleneck, reduces a communication latency, and improves communication efficiency, to improve training performance of the entire data training system.

In a possible implementation, in a specific data training process, the data processing method shown in FIG. 9 and any one of the possible implementations of the data processing method may be used together with the data processing method shown in FIG. 11 and any one of the possible implementations of the data processing method. That is, in the forward propagation process at the embedding layer for data training, search for the embedding parameter is implemented based on the foregoing ring communication architecture, and then in the back propagation process at the embedding layer for data training, obtaining the gradient is implemented based on the foregoing ring communication architecture.

Figure 13:
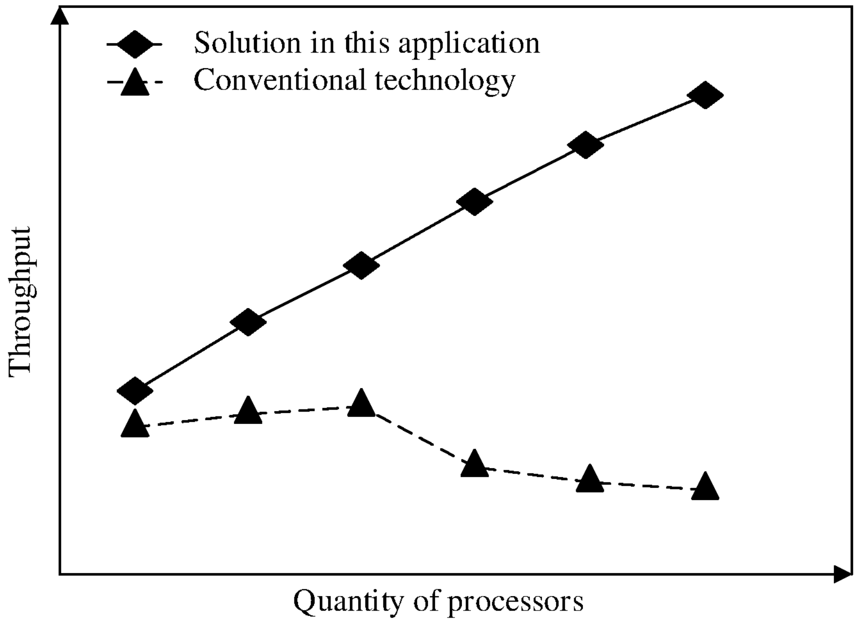
FIG. 13 is a schematic diagram of comparison between a communication throughput in this solution and a communication throughput in a solution in a conventional technology.

FIG. 13 is a schematic diagram of comparison between communication throughputs in a solution in a conventional technology shown in FIG. 3 and a solution provided in this application. The throughput refers to an amount of data that is successfully sent per unit time. In FIG. 13, a horizontal axis represents a quantity of processors used by a data training system, and the quantity of processors increases along a direction of an arrow. A vertical axis represents a throughput, and the throughput increases along a direction of an arrow. It can be learned that, in the solution in the conventional technology, a many-to-many message communication manner is used. As a quantity of processors increases, a throughput in the solution changes slightly, or even decreases. In this application, message communication is implemented by using a ring communication architecture. As a quantity of processors increases, a throughput in this application may increase with the increase of the quantity of processors with excellent linearity. This is because the ring communication architecture can fully use network bandwidth, and blocking and jitter in the many-to-many message communication manner do not easily occur. In a possible implementation, in this application, message communication is performed in forward propagation and back propagation at the embedding layer by using the ring communication architecture, so that a communication latency can be reduced to 10% to 30% of an original communication latency, greatly improving communication efficiency, and further improving performance of a data training system.

The foregoing mainly describes the data processing method provided in embodiments of this application. It may be understood that, to implement the foregoing corresponding functions, each device includes a corresponding hardware structure and/or a corresponding software module for performing the functions. In combination with example units and steps described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the device may be divided into functional modules based on the foregoing method examples. For example, each functional module corresponding to each function may be obtained through division, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

Figure 14:
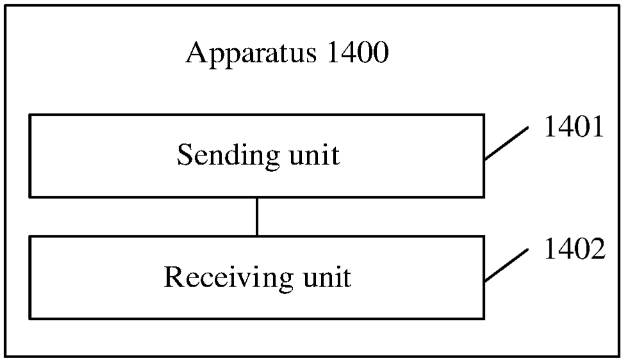
FIG. 14 and FIG. 15 each are a schematic diagram of a logical structure of an apparatus according to this application.

When each functional module corresponding to each function is obtained through division, FIG. 14 is a schematic diagram of a possible logical structure of an apparatus. The apparatus may be the first processor in the method and the possible implementations of the method in FIG. 9, or may be a chip in the first processor, or may be a processing system in the first processor, or the like. The apparatus 1400 includes a sending unit 1401 and a receiving unit 1402.

The sending unit 1401 is configured to send a first search message to a second processor, where the first search message includes first data, and the first search message is used to search for an embedding parameter of the first data; and the second processor is a next-hop processor of the first processor in a ring communication architecture in which the first processor is located. The sending unit 1401 may be implemented through a sending interface or a transmitter, and may perform the operation described in step 901 shown in FIG. 9.

The receiving unit 1402 is configured to receive a second search message from a third processor, where the second search message includes second data, and the second search message is used to search for an embedding parameter of the second data; and the third processor is a previous-hop processor of the first processor in the ring communication architecture. The receiving unit 1402 may be implemented through a receiving interface or a receiver, and may perform the operation described in step 902 shown in FIG. 9.

The first processor, the second processor, and the third processor are processors in N processors included in the data training system, where N is an integer greater than or equal to 3; and the N processors communicate with each other by using the ring communication architecture, and in the ring communication architecture, each of the N processors receives a message only from a previous-hop processor of each processor and sends a message only to a next-hop processor of each processor.

In a possible implementation, the apparatus further includes an adding unit.

When embedding parameters of some or all data in the second data are found based on the second search message, the adding unit is configured to add the embedding parameters of the some or all data to the second search message to obtain a third search message.

The sending unit 1401 is further configured to send the third search message to the second processor.

Alternatively, the sending unit 1401 is further configured to send the second search message to the second processor when an embedding parameter of the second data is not found based on the second search message.

In a possible implementation, the apparatus further includes a searching unit.

The searching unit is configured to search a first embedding table for embedding parameters to which the some or all data is mapped, where the first embedding table is an embedding table that is maintained by the first processor and that is used to store data and an embedding parameter, and there is a one-to-one mapping relationship between data and an embedding parameter in the first embedding table.

The adding unit is specifically configured to add, to value ranges corresponding to the some or all data in the second search message, the embedding parameters to which the some or all data is mapped, to obtain the third search message.

The sending unit 1401 is specifically configured to send the third search message to the second processor, where the third search message is used to search for an embedding parameter of data whose embedding parameter is not found in the second data.

In a possible implementation, the apparatus further includes a determining unit and a generation unit.

The determining unit is configured to determine that the some or all data belongs to the first embedding table, and the first embedding table does not include the some or all data, where the first embedding table is an embedding table that is maintained by the first processor and that is used to store data and an embedding parameter, and there is a one-to-one mapping relationship between data and an embedding parameter in the first embedding table.

The generation unit is configured to generate embedding parameters respectively corresponding to the some or all data.

The adding unit is specifically configured to add, to value ranges corresponding to the some or all data in the second search message, the embedding parameters respectively corresponding to the some or all data, to obtain the third search message.

The sending unit 1401 is specifically configured to send the third search message to the second processor, where the third search message is used to search for an embedding parameter of data whose embedding parameter is not found in the second data.

In a possible implementation, the sending unit 1401 is specifically configured to: send the second search message to the second processor when none of the second data belongs to data in a first embedding table, where the first embedding table is an embedding table that is maintained by the first processor and that is used to store data and an embedding parameter, and there is a one-to-one mapping relationship between data and an embedding parameter in the first embedding table.

In a possible implementation, the receiving unit 1402 is further configured to receive a fourth search message from the third processor, where the fourth search message includes third data and an embedding parameter to which a first part of data in the third data is mapped, and the fourth search message is used to search for an embedding parameter to which data other than the first part of data in the third data is mapped.

The apparatus further includes the adding unit, and when an embedding parameter of a second part of data in the third data is found based on the fourth search message, the adding unit is configured to add the embedding parameter of the second part of data to the fourth search message to obtain a fifth search message.

The sending unit 1401 is further configured to send the fifth search message to the second processor.

Alternatively, the sending unit 1401 is further configured to send the fourth search message to the second processor when an embedding parameter of the third data is not found based on the fourth search message.

In a possible implementation, the receiving unit 1402 is further configured to: receive a sixth search message from the third processor, where the sixth search message includes the first data and the embedding parameter of the first data.

For specific operations and beneficial effects of the units in the apparatus 1400 shown in FIG. 14, refer to corresponding descriptions in FIG. 9 and the possible method embodiment thereof. Details are not described herein again.

Figure 15:
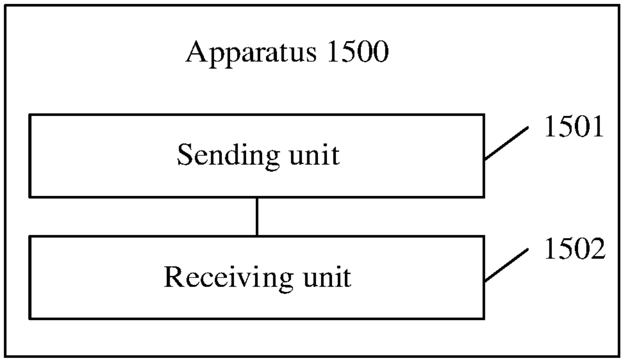

When each functional module corresponding to each function is obtained through division, FIG. 15 is a schematic diagram of a possible logical structure of an apparatus. The apparatus may be the first processor in the method and the possible implementations of the method in FIG. 11, or may be a chip in the first processor, or may be a processing system in the first processor, or the like. The apparatus 1500 includes a sending unit 1501 and a receiving unit 1502.

The sending unit 1501 is configured to send a first notification message to a second processor, where the first notification message includes first data and a first gradient, and is used to propagate the first gradient to a first target processor; the first gradient is a gradient corresponding to an embedding parameter of the first data; and the second processor is a next-hop processor of the first processor in a ring communication architecture in which the first processor is located. The sending unit 1501 may be implemented through a sending interface or a transmitter, and may perform the operation described in step 1101 shown in FIG. 11.

The receiving unit 1502 is configured to receive a second notification message from a third processor, where the second notification message includes second data and a second gradient, and is used to propagate the second gradient to a second target processor; the second gradient is a gradient corresponding to an embedding parameter of the second data; and the third processor is a previous-hop processor of the first processor in the ring communication architecture. The receiving unit 1502 may be implemented through a receiving interface or a receiver, and may perform the operation described in step 1102 shown in FIG. 11.

The first processor, the second processor, and the third processor are processors in N processors included in the data training system, where N is an integer greater than or equal to 3; and the N processors communicate with each other by using the ring communication architecture, and in the ring communication architecture, each of the N processors receives a message only from a previous-hop processor of each processor and sends a message only to a next-hop processor of each processor.

In a possible implementation, the apparatus further includes an obtaining unit.

When the second notification message includes a first target gradient, the obtaining unit is configured to obtain the first target gradient from the second notification message.

The sending unit 1501 is further configured to send the second notification message to the second processor, where the first target gradient is a gradient of an embedding parameter in a first embedding table maintained by the first processor, and there is a one-to-one mapping relationship between data and an embedding parameter in the first embedding table.

Alternatively, the sending unit 1501 is further configured to send the second notification message to the second processor when the second notification message does not include the first target gradient.

In a possible implementation, the obtaining unit is specifically configured to:

determine that some or all data in the second data is the data in the first embedding table; and obtain the first target gradient from the second notification message based on the some or all data.

In a possible implementation, the receiving unit 1502 is further configured to receive a third notification message from the third processor, where the third notification message includes third data and a third gradient, and is used to propagate the third gradient to a third target processor; and the third gradient is a gradient corresponding to an embedding parameter of the third data.

The apparatus further includes the obtaining unit, and when the third notification message includes a second target gradient, the obtaining unit is configured to obtain the second target gradient from the third notification message.

The sending unit 1501 is further configured to send the third notification message to the second processor, where the second target gradient is a gradient of an embedding parameter in the first embedding table maintained by the first processor, and the first embedding table includes a mapping relationship between data and an embedding parameter of the data.

Alternatively, the sending unit 1501 is further configured to send the third notification message to the second processor when the third notification message does not include the second target gradient.

For specific operations and beneficial effects of the units in the apparatus 1500 shown in FIG. 15, refer to corresponding descriptions in FIG. 11 and the possible method embodiment thereof. Details are not described herein again.

Figure 16:
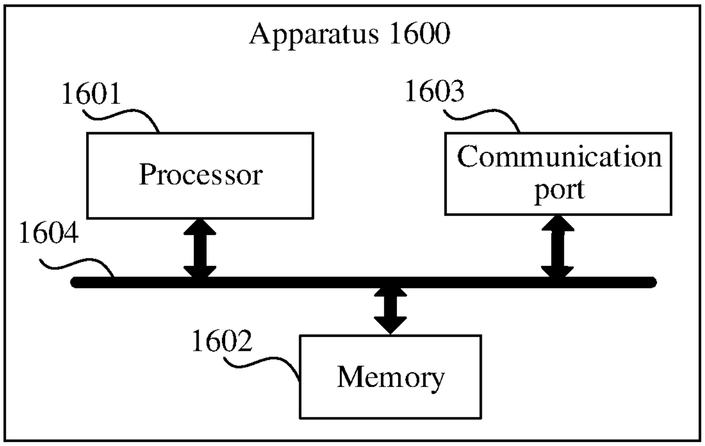
FIG. 16 is a schematic diagram of an entity structure of an apparatus according to this application.

FIG. 16 is a schematic diagram of a possible hardware structure of an apparatus according to this application. The apparatus may be the first processor in the method in the foregoing embodiment. The apparatus 1600 includes a processor 1601, a memory 1602, and a communication interface 1603. The processor 1601, the communication interface 1603, and the memory 1602 may be connected to each other or connected to each other through a bus 1604.

For example, the memory 1602 is configured to store a computer program and data of the apparatus 1600. The memory 1602 may include but is not limited to a random access memory (RAM), a read-only memory (ROM), an erasable programmable read-only memory (EPROM), a compact disc read-only memory (CD-ROM), or the like.

When the embodiment shown in FIG. 14 is implemented, software or program code required for performing functions of all or some units in FIG. 14 is stored in the memory 1602.

When the embodiment in FIG. 14 is implemented, if software or program code required by functions of some units is stored in the memory 1602, the processor 1601 may not only invoke the program code in the memory 1602 to implement some functions, but also cooperate with another component (for example, the communication interface 1603) to jointly implement another function (for example, a function of receiving or sending a message) described in the embodiment in FIG. 14.

When the embodiment shown in FIG. 15 is implemented, software or program code required for performing functions of all or some units in FIG. 15 is stored in the memory 1602.

When the embodiment in FIG. 15 is implemented, if software or program code required by functions of some units is stored in the memory 1602, the processor 1601 may not only invoke the program code in the memory 1602 to implement some functions, but also cooperate with another component (for example, the communication interface 1603) to jointly implement another function (for example, a function of receiving or sending a message) described in the embodiment in FIG. 15.

The communication interface 1603 includes a sending interface and a receiving interface. There may be a plurality of communication interfaces 1603 to support the apparatus 1600 in performing communication, for example, receiving or sending data or a message.

For example, the processor 1601 may be a central processing unit, a general-purpose processor, a digital signal processor, an application-specific integrated circuit, a field programmable gate array or another programmable logic device, a transistor logic device, a hardware component, or any combination thereof. Alternatively, the processor may be a combination of processors implementing a computing function, for example, a combination of one or more microprocessors or a combination of a digital signal processor and a microprocessor. The processor 1601 may be configured to read a program stored in the memory 1602, to perform any data processing method in FIG. 9 and the possible embodiment thereof. Alternatively, the processor 1601 may be configured to read a program stored in the memory 1602, to perform any data processing method in FIG. 11 and the possible embodiment thereof. Alternatively, the processor 1601 may be configured to read a program stored in the memory 1602, to perform any data processing method in FIG. 9 and the possible embodiment thereof and/or any data processing method in FIG. 11 and the possible embodiment thereof.

In a possible implementation, the processor 1601 may be configured to read the program stored in the memory 1602, to perform the following operations:

sending a first search message to a second processor through the sending interface, where the first search message includes first data, and the first search message is used to search for an embedding parameter of the first data; and the second processor is a next-hop processor of the first processor in a ring communication architecture in which the first processor is located; and receiving a second search message from a third processor through the receiving interface, where the second search message includes second data, and the second search message is used to search for an embedding parameter of the second data; and the third processor is a previous-hop processor of the first processor in the ring communication architecture.

The first processor, the second processor, and the third processor are processors in N processors included in the data training system, where N is an integer greater than or equal to 3; and the N processors communicate with each other by using the ring communication architecture, and in the ring communication architecture, each of the N processors receives a message only from a previous-hop processor of each processor and sends a message only to a next-hop processor of each processor.

In another possible implementation, the processor 1601 may be configured to read the program stored in the memory 1602, to perform the following operations:

sending a first notification message to a second processor through the sending interface, where the first notification message includes first data and a first gradient, and is used to propagate the first gradient to a first target processor; the first gradient is a gradient corresponding to an embedding parameter of the first data; and the second processor is a next-hop processor of the first processor in a ring communication architecture in which the first processor is located; and receiving a second notification message from a third processor through the receiving interface, where the second notification message includes second data and a second gradient, and is used to propagate the second gradient to a second target processor; the second gradient is a gradient corresponding to an embedding parameter of the second data; and the third processor is a previous-hop processor of the first processor in the ring communication architecture.

The first processor, the second processor, and the third processor are processors in N processors included in the data training system, where N is an integer greater than or equal to 3; and the N processors communicate with each other by using the ring communication architecture, and in the ring communication architecture, each of the N processors receives a message only from a previous-hop processor of each processor and sends a message only to a next-hop processor of each processor.

For specific operations and beneficial effects of the units in the apparatus 1600 shown in FIG. 16, refer to corresponding descriptions in FIG. 9 and/or FIG. 11 and the possible method embodiment thereof. Details are not described herein again.

An embodiment of this application further provides a computer-readable storage medium. The computer-readable storage medium stores a computer program, and the computer program is executed by a processor to implement the method in FIG. 9 and/or FIG. 11 and any one of the possible method embodiments thereof.

An embodiment of this application further provides a computer program product. When the computer program product is read and executed by a computer, the method in FIG. 9 and/or FIG. 11 and any one of the possible method embodiments thereof is performed.

In conclusion, message communication between the foregoing N processors in forward propagation and back propagation processes at an embedding layer may be implemented by using the ring communication architecture, and message exchange is implemented through ring communication. Compared with a many-to-many message communication manner in a solution in a conventional technology, this manner in this application can fully utilize bandwidth resources between the processors, avoid a single-point communication bottleneck, reduce a communication latency, and improve communication efficiency, to improve training efficiency and performance of the entire data training system.

Finally, it should be noted that, the foregoing embodiments are merely used to describe the technical solutions of this application, but not to limit the technical solutions. Although this application is described in detail with reference to the foregoing embodiments, a person of ordinary skill in the art should understand that the technical solution described in the foregoing embodiments may still be modified, or some or all of the technical features thereof may be equivalently replaced. However, these modifications or replacements do not make the essence of the corresponding technical solutions depart from the scope of the technical solutions in embodiments of this application.

What is claimed is:

1. A data processing method comprising:

sending, by a first processor of a data processing device, a first search message to a second processor, wherein the first search message comprises first data and is used for searching for an embedding parameter of the first data, wherein the embedding parameter of the first data is stored in an embedding table maintained by a processor other than the first processor, and the second processor is a next-hop processor of the first processor in a ring communication architecture in which the first processor is located; and receiving, by the first processor, a second search message from a third processor, wherein the second search message comprises second data and is used for searching for an embedding parameter of the second data, and the third processor is a previous-hop processor of the first processor in the ring communication architecture, wherein the first processor, the second processor, and the third processor are among multiple processors comprised in a data training system, wherein the multiple processors implement data training in a data parallel plus a model parallel manner, the multiple processors communicate with each other by using the ring communication architecture, and in the ring communication architecture each processor of the multiple processors receives a message only from a previous-hop processor of said each processor and sends a message only to a next-hop processor of said each processor, wherein said each processor of the multiple processors maintains a separate and distinct embedding table, and there is a one-to-one mapping relationship between data and an embedding parameter in each embedding table.

2. The method according to claim 1, further comprising:

when embedding parameters of some or all data in the second data are found based on the second search message, adding, by the first processor, the embedding parameters of the some or all data to the second search message to obtain a third search message; and sending the third search message to the second processor; or when an embedding parameter of the second data is not found based on the second search message, sending, by the first processor, the second search message to the second processor.

3. The method according to claim 2, wherein when embedding parameters of the some or all data in the second data are found based on the second search message, the steps of adding the embedding parameters of the some or all data to the second search message to obtain the third search message and sending the third search message to the second processor comprise:

searching, by the first processor, a first embedding table for embedding parameters to which the some or all data is mapped, wherein the first embedding table is maintained by the first processor and is for storing data and an embedding parameter, and there is a one-to-one mapping relationship between the data and the embedding parameter in the first embedding table;

adding, by the first processor to value ranges corresponding to the some or all data in the second search message, the embedding parameters to which the some or all data is mapped, to obtain the third search message; and sending, by the first processor, the third search message to the second processor, wherein the third search message is for searching for an embedding parameter of data whose embedding parameter is not found in the second data.

4. The method according to claim 2, wherein the step of sending the second search message to the second processor when the embedding parameter of the second data is not found based on the second search message comprises:

sending, by the first processor, the second search message to the second processor when none of the second data belongs to data in a first embedding table, wherein the first embedding table is maintained by the first processor and is for storing data and an embedding parameter, and there is a one-to-one mapping relationship between data and an embedding parameter in the first embedding table.

5. The method according to of claim 1, further comprising:

receiving, by the first processor, a fourth search message from the third processor, wherein the fourth search message comprises third data and an embedding parameter to which a first part of data in the third data is mapped, and the fourth search message is for searching for an embedding parameter to which data other than the first part of data in the third data is mapped; and when an embedding parameter of a second part of data in the third data is found based on the fourth search message, adding, by the first processor, the embedding parameter of the second part of data to the fourth search message to obtain a fifth search message; and sending the fifth search message to the second processor; or when an embedding parameter of the third data is not found based on the fourth search message, sending, by the first processor, the fourth search message to the second processor.

6. The method according to claim 1, further comprising:

receiving, by the first processor, a sixth search message from the third processor, wherein the sixth search message comprises the first data and the embedding parameter of the first data.

7. A data processing method comprising:

sending, by a first processor of a data processing device, a first notification message to a second processor, wherein the first notification message comprises first data and a first gradient and is used for propagating the first gradient to a first target processor, the first gradient corresponds to an embedding parameter of the first data, wherein the embedding parameter of the first data is stored in an embedding table maintained by the first target processor, and the second processor is a next-hop processor of the first processor in a ring communication architecture in which the first processor is located; and receiving, by the first processor, a second notification message from a third processor, wherein the second notification message comprises second data and a second gradient and is used for propagating the second gradient to a second target processor, the second gradient corresponds to an embedding parameter of the second data, and the third processor is a previous-hop processor of the first processor in the ring communication architecture, wherein the first processor, the second processor, and the third processor are among multiple processors comprised in a data training system, wherein the multiple processors implement data training in a data parallel plus a model parallel manner, the multiple processors communicate with each other by using the ring communication architecture, and in the ring communication architecture each processor of the multiple processors receives a message only from a previous-hop processor of said each processor and sends a message only to a next-hop processor of said each processor, wherein said each processor of the multiple processors maintains a separate and distinct embedding table, and there is a one-to-one mapping relationship between data and an embedding parameter in each embedding table.

8. The method according to claim 7, further comprising:

when the second notification message comprises a first target gradient, obtaining, by the first processor, the first target gradient from the second notification message; and sending the second notification message to the second processor, wherein the first target gradient is of an embedding parameter in a first embedding table maintained by the first processor, and there is a one-to-one mapping relationship between data and an embedding parameter in the first embedding table; or when the second notification message does not comprise the first target gradient, sending, by the first processor, the second notification message to the second processor.

9. The method according to claim 8, wherein the step of obtaining the first target gradient from the second notification message when the second notification message comprises the first target gradient comprises:

determining, by the first processor, that some or all data in the second data is the data in the first embedding table; and obtaining, by the first processor, the first target gradient from the second notification message based on the some or all data.

10. The method according to claim 9, further comprising:

receiving, by the first processor, a third notification message from the third processor, wherein the third notification message comprises third data and a third gradient and is for propagating the third gradient to a third target processor, and the third gradient corresponds to an embedding parameter of the third data; and when the third notification message comprises a second target gradient, obtaining, by the first processor, the second target gradient from the third notification message; and sending the third notification message to the second processor, wherein the second target gradient is of an embedding parameter in the first embedding table maintained by the first processor, and the first embedding table comprises a mapping relationship between data and an embedding parameter of the data; or when the third notification message does not comprise the second target gradient, sending, by the first processor, the third notification message to the second processor.

11. A data processing device comprising:

a memory storing executable instructions;

a first processor configured to execute the executable instructions to:

send a first search message to a second processor, wherein the first search message comprises first data and is used for searching for an embedding parameter of the first data, wherein the embedding parameter of the first data is stored in an embedding table maintained by a processor other than the first processor, and the second processor is a next-hop processor of the data processing device in a ring communication architecture in which the data processing device is located; and receive a second search message from a third processor, wherein the second search message comprises second data and is used for searching for an embedding parameter of the second data, and the third processor is a previous-hop processor of the data processing device in the ring communication architecture, wherein the first processor, the second processor, and the third processor are among multiple processors comprised in a data training system, wherein the multiple processors implement data training in a data parallel plus a model parallel manner, the multiple processors communicate with each other by using the ring communication architecture, and in the ring communication architecture each processor of the multiple processors receives a message only from a previous-hop processor of said each processor and sends a message only to a next-hop processor of said each processor, wherein said each processor of the multiple processors maintains a separate and distinct embedding table, and there is a one-to-one mapping relationship between data and an embedding parameter in each embedding table.

12. The data processing device according to claim 11, wherein the first processor is further configured to:

when embedding parameters of some or all data in the second data are found based on the second search message, add the embedding parameters of the some or all data in the second data to the second search message to obtain a third search message; and send the third search message to the second processor; or when an embedding parameter of the second data is not found based on the second search message, send the second search message to the second processor.

13. The data processing device according to claim 12, wherein when embedding parameters of the data in the second data are found based on the second search message, the first processor is configured to add the embedding parameters of the data to the second search message to obtain the third search message and to send the third search message to the second processor by:

searching a first embedding table for embedding parameters to which the some or all data is mapped, wherein the first embedding table is maintained by the data processing device and is for storing data and an embedding parameter, and there is a one-to-one mapping relationship between data and an embedding parameter in the first embedding table;

adding, to value ranges corresponding to the some or all data in the second search message, the embedding parameters to which the some or all data is mapped, to obtain the third search message; and sending the third search message to the second processor, wherein the third search message is for searching for an embedding parameter of data whose embedding parameter is not found in the second data.

14. The data processing device according to claim 12, wherein when the embedding parameter of the second data is not found based on the second search message, the first processor is configured to send the second search message to the second processor by:

sending the second search message to the second processor when none of the second data belongs to data in a first embedding table, wherein the first embedding table is maintained by the data processing device and is for storing data and an embedding parameter, and there is a one-to-one mapping relationship between data and an embedding parameter in the first embedding table.

15. The data processing device according to claim 11, wherein the first processor is further configured to:

receive a fourth search message from the third processor, wherein the fourth search message comprises third data and an embedding parameter to which a first part of data in the third data is mapped, and the fourth search message is for searching for an embedding parameter to which data other than the first part of data in the third data is mapped; and when an embedding parameter of a second part of data in the third data is found based on the fourth search message, add the embedding parameter of the second part of data to the fourth search message to obtain a fifth search message; and send the fifth search message to the second processor; or when the embedding parameter of the third data is not found based on the fourth search message, send the fourth search message to the second processor.

16. The data processing device according to claim 11, wherein the first processor is further configured to:

receive a sixth search message from the third processor, wherein the sixth search message comprises the first data and the embedding parameter of the first data.

17. A data processing device comprising:

a memory storing executable instructions;

a first processor configured to execute the executable instructions to:

send a first notification message to a second processor, wherein the first notification message comprises first data and a first gradient, and is used for propagating the first gradient to a first target processor, the first gradient corresponds to an embedding parameter of the first data, wherein the embedding parameter of the first data is stored in an embedding table maintained by the first target processor, and the second processor is a next-hop processor of the data processing device in a ring communication architecture in which the data processing device is located; and receive a second notification message from a third processor, wherein the second notification message comprises second data and a second gradient, and is used for propagating the second gradient to a second target processor, the second gradient corresponds to an embedding parameter of the second data, and the third processor is a previous-hop of the data processing device in the ring communication architecture, wherein the first processor, the second processor, and the third processor are among multiple processors in a data training system, the multiple processors implement data training in a data parallel plus a model parallel manner, the multiple processors communicate with each other by using the ring communication architecture, and in the ring communication architecture each processor of the multiple processors receives a message only from a previous-hop processor of said each processor and sends a message only to a next-hop processor of said each processor, wherein said each processor of the multiple processors maintains a separate and distinct embedding table, and there is a one-to-one mapping relationship between data and an embedding parameter in each embedding table.

18. The data processing device according to claim 17, wherein the first processor is further configured to:

when the second notification message comprises a first target gradient, obtain the first target gradient from the second notification message; and send the second notification message to the second processor, wherein the first target gradient is of an embedding parameter in a first embedding table maintained by the data processing device, and there is a one-to-one mapping relationship between data and an embedding parameter in the first embedding table; or when the second notification message does not comprise the first target gradient, send the second notification message to the second processor.

19. The data processing device according to claim 18, wherein when the second notification message comprises the first target gradient, the first processor is configured to obtaining the first target gradient from the second notification message by:

determining that some or all data in the second data is the data in the first embedding table; and obtaining the first target gradient from the second notification message based on the some or all data.

20. The data processing device according to claim 17, wherein the first processor is further configured to:

receive a third notification message from the third processor, wherein the third notification message comprises third data and a third gradient, and is for propagating the third gradient to a third target processor, and the third gradient corresponds to an embedding parameter of the third data;

when the third notification message comprises a second target gradient, obtain the second target gradient from the third notification message; and send the third notification message to the second processor, wherein the second target gradient of an embedding parameter in the first embedding table maintained by the data processing device, and the first embedding table comprises a mapping relationship between data and an embedding parameter of the data; or when the third notification message does not comprise the second target gradient, send the third notification message to the second processor.

* * * * *